US011827503B2

(12) United States Patent
Theos et al.

(10) Patent No.: US 11,827,503 B2
(45) Date of Patent: Nov. 28, 2023

(54) ADAPTIVE ACCELERATION FOR MATERIALS HANDLING VEHICLE

(71) Applicant: Crown Equipment Corporation, New Bremen, OH (US)

(72) Inventors: Sebastian Theos, Vaterstetten (DE); Johannes Nachtigal, Munich (DE); Andreas Simon, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 79 days.

(21) Appl. No.: 17/249,798

(22) Filed: Mar. 15, 2021

(65) Prior Publication Data

US 2021/0292146 A1    Sep. 23, 2021

Related U.S. Application Data

(60) Provisional application No. 62/991,217, filed on Mar. 18, 2020, provisional application No. 62/991,206, filed on Mar. 18, 2020.

(51) Int. Cl.
*B66F 9/24* (2006.01)
*G05D 1/02* (2020.01)
(Continued)

(52) U.S. Cl.
CPC ............... *B66F 9/24* (2013.01); *B66F 9/127* (2013.01); *B66F 9/18* (2013.01); *G05D 1/0066* (2013.01);
(Continued)

(58) Field of Classification Search
CPC ... B66F 9/24; B66F 9/127; B66F 9/18; G05D 1/0066; G05D 1/0088; G05D 1/0223; G05D 1/0225; G05D 1/0221; G05D 2201/0216
See application file for complete search history.

(56) References Cited

U.S. PATENT DOCUMENTS

| 4,768,636 A | 9/1988 | Kazunori et al. |
| 4,942,529 A | 7/1990 | Avitan et al. |

(Continued)

FOREIGN PATENT DOCUMENTS

| CN | 104755339 A | 7/2015 |
| CN | 104915813 A | 9/2015 |

(Continued)

OTHER PUBLICATIONS

International Search Report and Written Opinion of the International Searching Authority dated Oct. 20, 2021; International Application No. PCT/US2021/042306; European Patent Office; Rijswijk, Netherlands.

(Continued)

*Primary Examiner* — Anshul Sood
*Assistant Examiner* — Matthew Ho
(74) *Attorney, Agent, or Firm* — Stevens & Showalter LLP

(57) ABSTRACT

Operating a materials handling vehicle includes monitoring, by a controller, a first vehicle drive parameter during a first manual operation of the vehicle by an operator; monitoring, by the controller, the first vehicle drive parameter during a second manual operation of the vehicle by the operator; receiving, by the controller after the first manual operation of the vehicle and the second manual operation of the vehicle, a request to implement a semi-automated driving operation; calculating, by the controller, a first weighted average based on the monitored first vehicle drive parameter during the first manual operation of the vehicle and the monitored first vehicle drive parameter during the second manual operation of the vehicle; and based at least in part on the calculated first weighted average, controlling, by the controller, implementation of the semi-automated driving operation.

28 Claims, 8 Drawing Sheets

(51) Int. Cl.
  *G05D 1/00* (2006.01)
  *B66F 9/12* (2006.01)
  *B66F 9/18* (2006.01)
(52) U.S. Cl.
  CPC ......... *G05D 1/0088* (2013.01); *G05D 1/0223* (2013.01); *G05D 1/0225* (2013.01); *G05D 1/0221* (2013.01); *G05D 2201/0216* (2013.01)

(56) References Cited

U.S. PATENT DOCUMENTS

| | | | |
|---|---|---|---|
| 7,017,689 | B2 | 3/2006 | Gilliland et al. |
| 7,233,861 | B2 | 6/2007 | Van Buer et al. |
| 7,302,338 | B2 | 11/2007 | Petzold et al. |
| 7,475,753 | B2 | 1/2009 | Oka et al. |
| 7,524,268 | B2 | 4/2009 | Oka et al. |
| 7,568,547 | B2 | 8/2009 | Yamada et al. |
| 7,693,641 | B2 | 4/2010 | Maruki |
| 8,072,309 | B2 | 12/2011 | Kraimer et al. |
| 8,392,049 | B2 | 3/2013 | Goodwin et al. |
| 8,412,431 | B2 | 4/2013 | Wetterer et al. |
| 8,634,980 | B1 | 1/2014 | Urmson et al. |
| 8,731,786 | B2 | 5/2014 | Tueshaus |
| 8,751,095 | B2 | 6/2014 | Goodwin et al. |
| 8,965,621 | B1 | 2/2015 | Urmson et al. |
| 9,082,293 | B2 | 7/2015 | Wellman et al. |
| 9,189,897 | B1 | 11/2015 | Stenneth |
| 9,358,975 | B1 | 6/2016 | Watts |
| 9,547,945 | B2 * | 1/2017 | McCabe ............... G07C 5/008 |
| 9,561,794 | B2 | 2/2017 | Watts |
| 9,561,941 | B1 | 2/2017 | Watts |
| 9,573,597 | B2 | 2/2017 | Uno |
| 9,645,968 | B2 | 5/2017 | Elston et al. |
| 9,650,233 | B2 | 5/2017 | Medwin et al. |
| 9,779,059 | B2 | 10/2017 | Kammerer et al. |
| 9,870,002 | B1 | 1/2018 | Holmberg et al. |
| 10,119,272 | B1 | 11/2018 | Shah et al. |
| 10,209,682 | B1 | 2/2019 | Iebert et al. |
| 10,336,150 | B1 | 7/2019 | Hebert et al. |
| 10,459,449 | B2 | 10/2019 | Watts |
| 10,795,364 | B1 | 10/2020 | Abeloe |
| 11,086,544 | B2 | 8/2021 | Yun et al. |
| 11,126,178 | B2 * | 9/2021 | Akella ............... B60W 30/14 |
| 2009/0132088 | A1 | 5/2009 | Taitler |
| 2010/0198513 | A1 | 8/2010 | Zeng et al. |
| 2010/0204891 | A1 | 8/2010 | Biggerstaff |
| 2011/0106362 | A1 | 5/2011 | Seitz |
| 2011/0137544 | A1 | 6/2011 | Kawazu et al. |
| 2012/0123614 | A1 * | 5/2012 | Laws ............... G05B 19/4189 701/2 |
| 2012/0277965 | A1 * | 11/2012 | Takahashi ........... B60W 30/143 701/70 |
| 2013/0197715 | A1 | 8/2013 | Otanez et al. |
| 2015/0094928 | A1 | 4/2015 | Matsumura |
| 2015/0149017 | A1 | 5/2015 | Attard et al. |
| 2015/0166069 | A1 | 6/2015 | Engelman et al. |
| 2015/0364021 | A1 | 12/2015 | Ur |
| 2016/0023675 | A1 | 1/2016 | Hannah et al. |
| 2016/0075339 | A1 | 3/2016 | Versteyhe et al. |
| 2016/0078694 | A1 | 3/2016 | Swift |
| 2016/0314428 | A1 | 10/2016 | Sugaya |
| 2017/0123423 | A1 | 5/2017 | Sako et al. |
| 2017/0174221 | A1 | 6/2017 | Vaughn et al. |
| 2017/0248965 | A1 | 8/2017 | Wellman et al. |
| 2018/0002894 | A1 | 1/2018 | Yamamoto et al. |
| 2018/0009643 | A1 | 1/2018 | Hoffman |
| 2018/0118219 | A1 | 5/2018 | Hiei et al. |
| 2018/0229988 | A1 | 8/2018 | Gault et al. |
| 2018/0327184 | A1 | 11/2018 | Sibley |
| 2018/0345984 | A1 * | 12/2018 | Lindelöf ............. G07C 5/0808 |
| 2018/0370780 | A1 | 12/2018 | Marsee |
| 2019/0011918 | A1 | 1/2019 | Son et al. |
| 2019/0137991 | A1 | 5/2019 | Agarwal |
| 2019/0145860 | A1 * | 5/2019 | Phillips ................ G05D 1/0088 701/33.9 |
| 2019/0184556 | A1 | 6/2019 | Sinyavaskiy et al. |
| 2019/0226178 | A1 | 7/2019 | Nakano et al. |
| 2019/0263447 | A1 | 8/2019 | Nakano et al. |
| 2019/0279493 | A1 * | 9/2019 | Kim ................... G01C 25/005 |
| 2019/0294175 | A1 | 9/2019 | Pajevic et al. |
| 2019/0302794 | A1 | 10/2019 | Kean et al. |
| 2019/0346862 | A1 * | 11/2019 | Switkes ............... B60W 10/20 |
| 2020/0012290 | A1 | 1/2020 | Watts |
| 2020/0089241 | A1 * | 3/2020 | Kao ................... G05D 1/0217 |
| 2020/0394562 | A1 | 12/2020 | Nonaka et al. |
| 2020/0409383 | A1 | 12/2020 | Maunder |
| 2021/0064026 | A1 | 3/2021 | Simon et al. |
| 2021/0087033 | A1 | 3/2021 | Kimura et al. |
| 2021/0276843 | A1 | 9/2021 | Garrison, III |
| 2021/0276844 | A1 | 9/2021 | Garrison, III |
| 2022/0363528 | A1 | 11/2022 | Okamoto et al. |

FOREIGN PATENT DOCUMENTS

| | | | |
|---|---|---|---|
| CN | 106061817 | A | 10/2016 |
| CN | 205740199 | U | 11/2016 |
| CN | 107063239 | A | 8/2017 |
| CN | 108216190 | A | 6/2018 |
| DE | 102014118079 | A1 | 6/2015 |
| DE | 102015113445 | A1 | 1/2017 |
| EP | 1770052 | A2 | 4/2007 |
| EP | 1770053 | A2 | 4/2007 |
| EP | 1770054 | A2 | 4/2007 |
| EP | 1985576 | A2 | 10/2008 |
| EP | 2279148 | A2 | 2/2011 |
| EP | 2741268 | A1 | 6/2014 |
| EP | 2886507 | A1 | 6/2014 |
| EP | 2848484 | A2 | 3/2015 |
| EP | 2860077 | A2 | 4/2015 |
| EP | 3098194 | A1 | 11/2016 |
| EP | 3118152 | A1 | 1/2017 |
| EP | 3132682 | A1 | 2/2017 |
| EP | 3498556 | A1 | 6/2019 |
| EP | 3647136 | A1 | 5/2020 |
| JP | 101261200 | A | 10/1989 |
| JP | H07187323 | | 7/1995 |
| JP | H09218136 | A | 8/1997 |
| WO | 2009129295 | A2 | 10/2009 |
| WO | 2011002478 | A2 | 1/2011 |
| WO | 2011059421 | A1 | 5/2011 |
| WO | 2015166811 | A1 | 11/2015 |
| WO | 2017105755 | A1 | 6/2017 |
| WO | 2018048641 | A1 | 3/2018 |
| WO | 2019183580 | A1 | 9/2019 |

OTHER PUBLICATIONS

International Preliminary Report on Patentability dated Mar. 1, 2022; International Application No. PCT/US2020/044262; The International Bureau of WIPO; Geneva, Switzerland.

Election/Restriction dated Jun. 20, 2022; U.S. Appl. No. 16/943,567; United States Patent and Trademark Office; Alexandria, Virginia.

International Search Report and Written Opinion of the International Searching Authority dated Nov. 12, 2020; International Application No. PCT/US2020/044262; European Patent Office; Rijswijk, Netherlands.

Al-Shihabi, Talal article dated Jan. 1, 2003; "Toward More Realistic Driving Behavior Models for Autonomous Vehicles in Driving Simulators"; Transportation Research Record: Journal of the Transportation Research Board; vol. 1843; Issue 1; pp. 41-49.

Calabrese, Marco et al. article dated Sep. 2008; "Experimental System to Support Real-Time Driving Pattern Recognition"; Advanced Intelligent Computing Theories and Applications. With Aspects of Artificial Intelligence; pp. 1192-1199.

International Search Report and Written Opinion of the International Searching Authority dated Jun. 1, 2021; International Application No. PCT/US2021/022279; European Patent Office; Rijswijk, Netherlands.

Kohlmeyer, Rolf R. article dated Nov. 2011 entitled "Modelling and Control of an Articulated Underground Mining Vehicle"; University of Pretoria; Pretoria, S. Africa.

(56) References Cited

OTHER PUBLICATIONS

U.S. Patent Application dated Mar. 15, 2021 entitled "Based on Detected Start of Picking Operation, Resetting Stored Data Related to Monitored Drive Parameter"; U.S. Appl. No. 17/249,799; United States Patent and Trademark Office; Alexandria, Virginia.

U.S. Patent Application dated Jul. 20, 2021 entitled "Adaptive Acceleration for Materials Handling Vehicle"; U.S. Appl. No. 17/443,044; United States Patent and Trademark Office; Alexandria, Virginia.

International Search Report and Written Opinion of the International Searching Authority dated Jul. 12, 2021; International Application No. PCT/US2021/022281; European Patent Office; Rijswijk, Netherlands.

International Preliminary Report on Patentability dated May 9, 2022; International Application No. PCT/US2021/022279; European Patent Office; Rijswijk, Netherlands.

Written Opinion of the International Preliminary Examining Authority dated Feb. 14, 2022; International Application No. PCT/US2021/022279; European Patent Office; Munich, Germany.

Office Action dated Sep. 14, 2022; U.S. Appl. No. 16/943,567; United States Patent and Trademark Office; Alexandria, Virginia.

International Preliminary Report on Patentability dated Sep. 20, 2022; International Application No. PCT/US2021/022281; The International Bureau of WIPO; Geneva, Switzerland.

Dominick Anthony Chir Mulder; Office Action; U.S. Appl. No. 17/249,799; dated Mar. 13, 2023; United States Patent and Trademark Office; Alexandria, Virginia.

Deng Congyao; Office Action; Chinese Application No. 202080060160.9; dated Feb. 23, 2023; CNIPA; Beijing, China.

Office Action dated Dec. 20, 2022; U.S. Appl. No. 16/943,567; United States Patent and Trademark Office; Alexandria, Virginia.

Baajour, Shahira; Non-Final Office Action, dated Jul. 6, 2023; U.S. Appl. No. 16/943,567; United States Patent and Trademark Office; Alexandria, Virginia.

Mulder, Dominick Anthony Chir; Final Office Action dated Sep. 12, 2023; U.S. Appl. No. 17/249,799; United States Patent and Trademark Office; Alexandria, Virginia.

Szpaizer, Ana; Official Action dated Sep. 8, 2023; Canadian Application No. 3,163,201; CIPO; Quebec, Canada.

* cited by examiner

| Time increment | Acceleration values manual mode $a_x$ in (m/s$^2$) | Time increment | Acceleration values manual mode $a_x$ in (m/s$^2$) | Time increment | Acceleration values manual mode $a_x$ in (m/s$^2$) |
|---|---|---|---|---|---|
| 1 | 1 | 10 | 0 | 19 | 6 |
| 2 | 2 | 11 | 5 | 20 | 6 |
| 3 | 4 | 12 | 4 | 21 | 1 |
| 4 | 8 | 13 | 2 | 22 | 2 |
| 5 | 3 | 14 | 1 | 23 | 5 |
| 6 | 2 | 15 | 1 | 24 | 5 |
| 7 | 1 | 16 | 3 | 25 | 3 |
| 8 | 0 | 17 | 4 | 26 | 2 |
| 9 | 0 | 18 | 5 | 27 | 1 |

Table 1

FIG. 5

| (Weighted) average | $wa_{x-1}$ start value | $wa_{x-2}$ | $wa_{x-3}$ | $wa_{x-4}$ | $wa_{x-5}$ | $wa_{x-6}$ | $wa_{x-7}$ | $wa_{x-8}$ | $wa_{x-9}$ |
|---|---|---|---|---|---|---|---|---|---|
| Result [m/s²] | 2.33 | 3.33 | 1.83 | 2.42 | 1.87 | 2.94 | 3.64 | 3.82 | 2.91 |

Table 2

| Acceleration y-direction | $a_{y-1}$ | $a_{y-2}$ | $a_{y-3}$ | $a_{y-4}$ | $a_{y-5}$ | $a_{y-6}$ | $a_{y-7}$ | $a_{y-8}$ | $a_{y-9}$ |
|---|---|---|---|---|---|---|---|---|---|
| Result [m/s²] | 0.25 | 0.49 | 0.52 | 0.54 | 0.75 | 0.72 | 0.60 | 0.39 | 0 |

Table 3

| (Weighted) average | $wa_{y-1}$ start value | $wa_{y-2}$ | $wa_{y-3}$ |
|---|---|---|---|
| Result [m/s²] | 0.42 | 0.55 | 0.44 |

Table 4

FIG. 9

| Maximum Acceleration Weighted Average During Manual Operation | | $a_{x-wa-max-1}$ | $a_{x-wa-max-2}$ | $a_{x-wa-max-3}$ | $a_{x-wa-max-4}$ |
|---|---|---|---|---|---|
| Result [m/s²] | | 3.82 | 3.34 | 1.82 | 2.4 |

FIG. 10

| Maximum Acceleration Weighted Average During Manual Operation | | $a_{y-wa-max-1}$ | $a_{y-wa-max-2}$ | $a_{y-wa-max-3}$ |
|---|---|---|---|---|
| Result [m/s²] | | 0.55 | 0.10 | 1.2 |

FIG. 11

| Categorization ranges for filtered, max. acceleration in y-direction [m/s$^2$] | Rating | Correction factor corr$_y$ |
|---|---|---|
| 0.50 - 0.75 | High acceleration | +10% |
| 0.25 - 0.49 | Medium acceleration | 0% - no correction |
| 0.00 - 0.24 | Low acceleration | -10% |

Lookup Table

ADAPTIVE ACCELERATION FOR MATERIALS HANDLING VEHICLE

RELATED APPLICATIONS

This application claims the benefit of U.S. Provisional Application No. 62/991,206, filed Mar. 18, 2020, entitled "ADAPTIVE ACCELERATION FOR MATERIALS HANDLING VEHICLE," which is herein incorporated by reference in its entirety. This application still further claims the benefit of U.S. Provisional Application No. 62/991,217, filed Mar. 18, 2020, entitled "BASED ON DETECTED START OF PICKING OPERATION, RESETTING STORED DATA RELATED TO MONITORED DRIVE PARAMETER," which is herein incorporated by reference in its entirety.

BACKGROUND

Materials handling vehicles are commonly used for picking stock in warehouses and distribution centers. Such vehicles typically include a power unit and a load handling assembly, which may include load carrying forks. The vehicle also has control structures for controlling operation and movement of the vehicle.

In a typical stock picking operation, an operator fills orders from available stock items that are located in storage areas provided along one or more aisles of a warehouse or distribution center. The operator drives the vehicle between various pick locations where item(s) are to be picked. The operator may drive the vehicle either by using the control structures on the vehicle, or via a wireless remote control device that is associated with the vehicle.

BRIEF SUMMARY

In accordance with a first aspect of the present disclosure, a method is provided for operating a materials handling vehicle comprising: monitoring, by a controller, a first vehicle drive parameter during a first manual operation of the vehicle by an operator; monitoring, by the controller, the first vehicle drive parameter during a second manual operation of the vehicle by the operator; receiving, by the controller after the first manual operation of the vehicle and the second manual operation of the vehicle, a request to implement a semi-automated driving operation; calculating, by the controller, a first weighted average based on the monitored first vehicle drive parameter during the first manual operation of the vehicle and the monitored first vehicle parameter during the second manual operation of the vehicle; and based at least in part on the calculated first weighted average, controlling, by the controller, implementation of the semi-automated driving operation.

In accordance with this aspect, calculating the first weighted average may comprise: calculating a first component of the first weighted average by applying a first weight value to a first processed value related to the monitored vehicle parameter during the first manual operation of the vehicle; calculating a second component of the first weighted average by applying a second weight value to a second processed value related to the monitored vehicle parameter during the second manual operation of the vehicle; and calculating the first weighted average based on the calculated first and second components. In accordance with this aspect, the first weight value may be different than the second weight value. Furthermore, the second weight value may be larger than the first weight value.

In accordance with this aspect, the second manual operation of the vehicle may occur closer in time, than the first manual operation, to receive the request to implement the semi-automated driving operation.

In accordance with a second aspect of the present disclosure, the monitored first vehicle parameter may correspond to a first direction of travel of the vehicle.

Additionally, in accordance with the second aspect, the method can include concurrently monitoring, by the controller, a second vehicle drive parameter corresponding to a second direction different from the first direction of travel during the first manual operation and the second manual operation of the vehicle by the operator. In accordance with this aspect, the method can include calculating, by the controller, a second weighted average based on the monitored second vehicle drive parameter during the first manual operation of the vehicle and the monitored second vehicle parameter during the monitored second manual operation of the vehicle. Furthermore, the first vehicle drive parameter can comprise acceleration in the first direction and the second vehicle drive parameter can comprise acceleration in the second direction, wherein the first and second directions may be substantially orthogonal to each other.

In accordance with aspects of the disclosure, the method can include modifying the calculated first weighted average based on the calculated second weighted average when the calculated second weighted average falls outside of a predefined mid-range.

Furthermore, based on the modified first weighted average, the controller can control implementation of the semi-automated driving operation, wherein controlling implementation of the semi-automated driving operation comprises limiting a maximum acceleration of the vehicle.

A further aspect of the present disclosure includes a system for operating a materials handling vehicle comprising: a memory storing executable instructions; and a processor in communication with the memory, wherein execution of the executable instructions by the processor causes the processor to: monitor a first vehicle drive parameter during a first manual operation of the vehicle by an operator; monitor the first vehicle drive parameter during a second manual operation of the vehicle by the operator; receive, after the first manual operation of the vehicle and the second manual operation of the vehicle, a request to implement a semi-automated driving operation; calculate a first weighted average based on the monitored first vehicle drive parameter during the first manual operation of the vehicle and the monitored first vehicle parameter during the second manual operation of the vehicle; and control implementation of the semi-automated driving operation based at least in part on the calculated first weighted average.

In accordance with this further aspect, calculating the first weighted average may comprise: calculating a first component of the first weighted average by applying a first weight value to a first processed value related to the monitored vehicle parameter during the first manual operation of the vehicle; calculating a second component of the first weighted average by applying a second weight value to a second processed value related to the monitored vehicle parameter during the second manual operation of the vehicle; and calculating the first weighted average based on the calculated first and second components. In accordance with this aspect, the first weight value may be different than the second weight value. Furthermore, the second weight value may be larger than the first weight value.

In accordance with this further aspect, the second manual operation of the vehicle may occur closer in time, than the first manual operation, to receive the request to implement the semi-automated driving operation.

In accordance with yet another aspect of the present disclosure, the monitored first vehicle parameter may correspond to a first direction of travel of the vehicle.

Additionally, in accordance with the above aspect, the system can include the processor concurrently monitoring a second vehicle drive parameter corresponding to a second direction different from the first direction of travel during the first manual operation and the second manual operation of the vehicle by the operator. In accordance with this aspect, the processor can calculate a second weighted average based on the monitored second vehicle drive parameter during the first manual operation of the vehicle and the monitored second vehicle drive parameter during the monitored second manual operation of the vehicle. Furthermore, the first vehicle drive parameter can comprise acceleration in the first direction and the second vehicle drive parameter can comprise acceleration in the second direction, wherein the first and second directions may be substantially orthogonal to each other.

In accordance with the further aspects, the system can include the processor modifying the calculated first weighted average based on the calculated second weighted average when the calculated second weighted average falls outside of a predefined mid-range.

Furthermore, based on the modified first weighted average, the processor can control implementation of the semi-automated driving operation, wherein controlling implementation of the semi-automated driving operation comprises limiting a maximum acceleration of the vehicle.

BRIEF DESCRIPTION OF THE SEVERAL VIEWS OF THE DRAWINGS

FIG. 5 illustrates a table containing non-real sample acceleration values in the first direction corresponding to a most recent manual operation of the vehicle;

FIG. 9 illustrates a table containing sample values of $wa_{y-i}$;

FIG. 10 illustrates a table containing sample values of $a_{x-wa-max-i}$;

FIG. 11 illustrates a table containing sample values of $a_{y-wa-max-i}$;

DETAILED DESCRIPTION

In the following detailed description of the illustrated embodiments, reference is made to the accompanying drawings that form a part hereof, and in which is shown by way of illustration, and not by way of limitation, specific embodiments that may be practiced. It is to be understood that other embodiments may be utilized and that changes may be made without departing from the spirit and scope of various embodiments of this disclosure.

Low Level Order Picking Truck

Figure 1A:
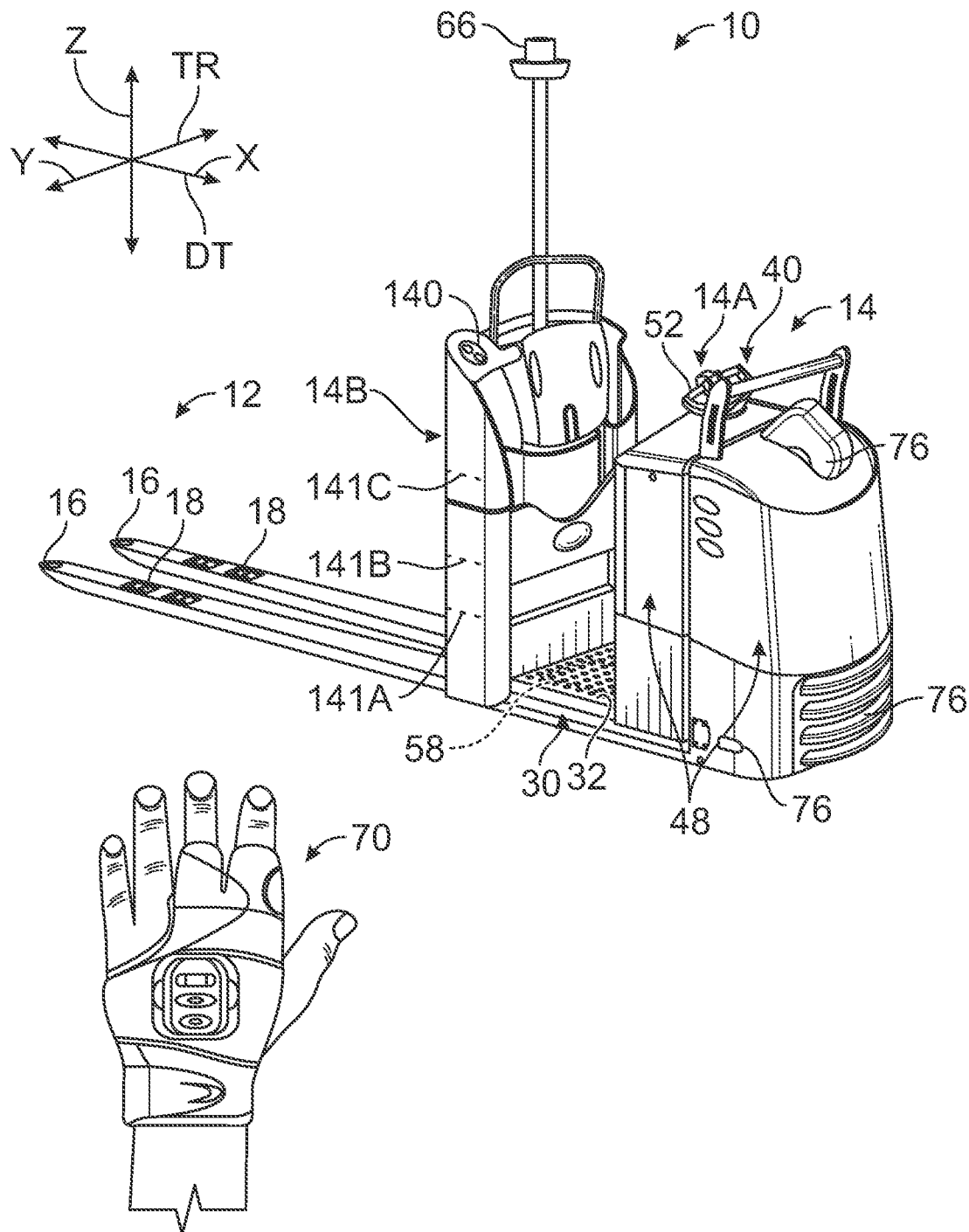
FIG. 1A and FIG. 1B are illustrations of a materials handling vehicle capable of remote wireless operation according to various aspects of the present disclosure.
Figure 1B:
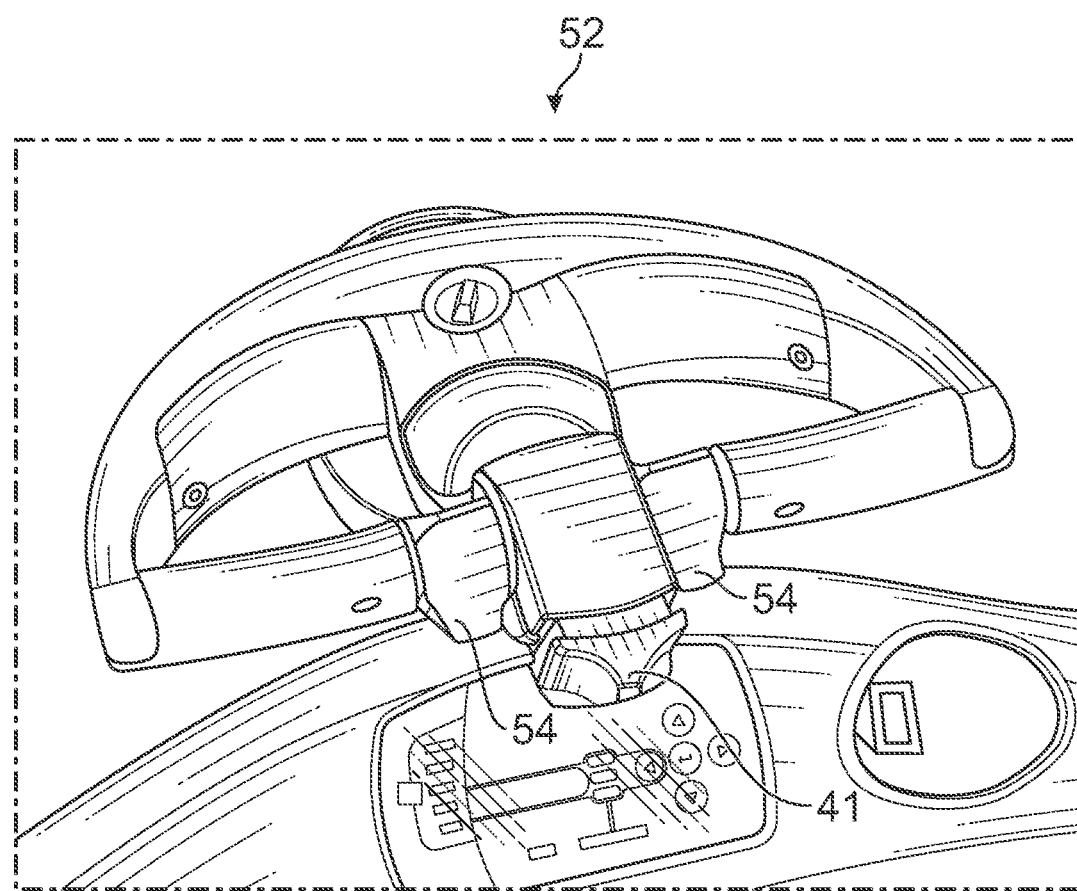

Referring now to the drawings, and particularly to FIGS. 1A and 1B, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks. Still further, the load handling assembly 12 may include load handling features such as a mast, a load platform, a collection cage or other support structure carried by the forks 16 or otherwise provided for handling a load supported and carried by the truck 10 or pushed or pulled by the truck, i.e., such as by a tugger vehicle.

The illustrated power unit 14 comprises a step-through operator's station 30 dividing a first end section 14A of the power unit 14 (opposite the forks 16) from a second end section 14B (proximate the forks 16). The step-through operator's station 30 provides a platform 32 upon which an operator may stand to drive the truck 10 and/or to provide a position from which the operator may operate the various included features of the truck 10.

A first work area is provided towards the first end section 14A of the power unit 14 and includes a control area 40 for driving the truck 10 when the operator is standing on the platform 32 and for controlling the features of the load handling assembly 12. The first end section 14A defines a compartment 48 for containing a battery, control electronics, including a controller 103 (see FIG. 2), and motor(s), such as a traction motor, steer motor and lift motor for the forks (not shown).

As shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10, see FIGS. 1A and 1B. For example, as shown, a control such as a switch grip or travel switch 54 may be provided on the handle 52, which is spring biased to a center neutral position. Rotating the travel switch 54 forward and upward will cause the truck 10 to move forward, e.g., power unit first, at an acceleration proportional to the amount of rotation of the travel switch 54 until the truck 10 reaches a predefined maximum speed, at which point the truck 10 is no longer permitted to accelerate to a higher speed. For example, if the travel switch 54 is very quickly rotated 50% of a maximum angle of rotation capable for the travel switch 54, the truck 10 will accelerate at approximately 50% of the maximum acceleration capable for the truck until the truck reaches 50% of the maximum speed capable for the truck. It is also contemplated that acceleration may be determined using an acceleration map stored in memory where the rotation angle of the travel switch 54 is used as an input into and has a corresponding acceleration value in the acceleration map. The acceleration values in the acceleration map corresponding to the travel switch rotation angles may be proportional to the travel switch rotation angles or vary in any desired manner. There may also be a velocity map stored in memory where the rotation angle of the travel switch 54 is used as an input into and has a corresponding maximum velocity value stored in the velocity map. For example, when the travel switch 54 is rotated 50% of the maximum angle capable for the travel switch 54, the truck will accelerate at a corresponding acceleration value stored in the acceleration map to a maximum velocity value stored in the velocity map corresponding to the travel switch angle of 50% of the maximum angle. Similarly, rotating the travel switch 54 toward the rear and downward of the truck 10 will cause the truck 10 to move in reverse, e.g., forks first, at an acceleration proportional to the amount of rotation of the travel switch 54 until the truck 10 reaches a predefined maximum speed corresponding to the amount of rotation of the travel switch 54, at which point the truck 10 is no longer permitted to accelerate to a higher speed.

Presence sensors 58 may be provided to detect the presence of an operator on the truck 10. For example, presence sensors 58 may be located on, above or under the platform floor, or otherwise provided about the operator's station 30. In the exemplary truck 10 of FIG. 1, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform floor, such as by using ultrasonic, capacitive, laser scanner, camera or other suitable sensing technology. The utilization of presence sensors 58 will be described in greater detail herein.

An antenna 66 extends vertically from the power unit 14 and is provided for receiving control signals from a corresponding wireless remote control device 70. It is also contemplated that the antenna 66 may be provided within the compartment 48 of the power unit 14 or elsewhere on the truck 10. According to one embodiment, the vehicle 10 may include a pole (not shown) that extends vertically from the power unit 14 and includes an antenna 66 that is provided for receiving control signals from a corresponding wireless remote control device 70. The pole may include a light at the top, such that the pole and light define a light tower. The remote control device 70 may comprise a transmitter that is worn or otherwise maintained by the operator. The remote control device 70 is manually operable by an operator, e.g., by pressing a button or other control, to cause the remote control device 70 to wirelessly transmit at least a first type of signal designating a travel request to the truck 10. The travel request is a command that requests the corresponding truck 10 to travel by a predetermined amount, as will be described in greater detail herein.

The truck 10 also comprises one or more obstacle sensors 76, which are provided about the truck 10, e.g., towards the first end section of the power unit 14 and/or to the sides of the power unit 14. The obstacle sensors 76 include at least one contactless obstacle sensor on the truck 10, and are operable to define at least one detection zone. For example, at least one detection zone may define an area at least partially in front of a forward traveling direction of the truck 10 when the truck 10 is traveling in response to a wirelessly received travel request from the remote control device 70.

The obstacle sensors 76 may comprise any suitable proximity detection technology, such as ultrasonic sensors, optical recognition devices, infrared sensors, laser scanner sensors, etc., which are capable of detecting the presence of objects/obstacles or are capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Similarly, although the remote control device 70 is illustrated as a glove-like structure 70, numerous implementations of the remote control device 70 may be implemented, including for example, finger worn, lanyard or sash mounted, etc. Still further, the truck, remote control system and/or components thereof, including the remote control device 70, may comprise any additional and/or alternative features or implementations.

Control System for Remote Operation of a Low Level Order Picking Truck

Figure 2:
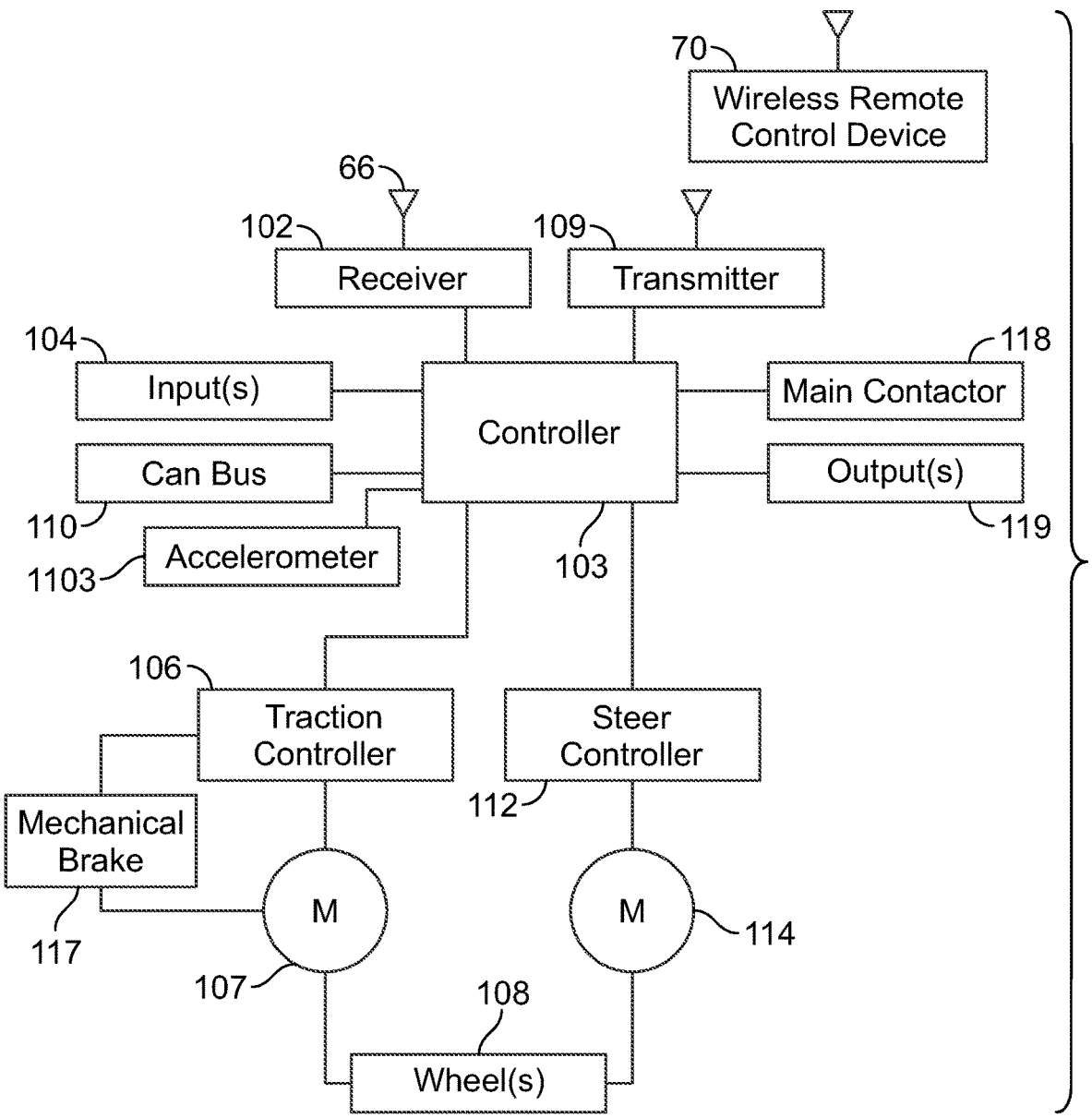
FIG. 2 is a schematic diagram of several components of a materials handling vehicle capable of remote wireless operation according to various aspects of the present disclosure.

Referring to FIG. 2, a block diagram illustrates a control arrangement for integrating remote control commands with the truck 10. The antenna 66 is coupled to a receiver 102 for receiving commands issued by the remote control device 70. The receiver 102 passes the received control signals to the controller 103, which implements the appropriate response to the received commands and may thus also be referred to herein as a master controller. In this regard, the controller 103 is implemented in hardware and may also execute software (including firmware, resident software, microcode, etc.). Furthermore, aspects of the present disclosure may take the form of a computer program product embodied in one or more computer readable medium(s) having computer readable program code embodied thereon.

Thus, the controller 103 may comprise an electronic controller defining, at least in part, a data processing system suitable for storing and/or executing program code and may include at least one processor coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc. The at least one processor may include any processing component operable to receive and execute instructions (such as program code from one or more memory elements). The at least one processor may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The response implemented by the controller 103 in response to wirelessly received commands, e.g., via the wireless transmitter of the remote control device 70 and corresponding antennae 66 and receiver 102, may comprise one or more actions, or inactions, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, load sensors, encoders and other devices/features available to the truck 10 to determine appropriate action in response to the received commands from the remote control device 70. The sensors 58, 76, etc. may be coupled to the controller 103 via the inputs 104 or via a suitable truck network, such as a control area network (CAN) bus 110.

The controller 103 is also capable of determining the vertical location, i.e., height, of the load handling assembly 12 including the forks 16 relative to ground, such as a floor surface along which the truck 10 travels, as follows. One or more height sensors or switches may be provided in the second end section 14B of the power unit 14, which sense when the load handling assembly 12 including the forks 16 is raised vertically relative to ground and/or a lower point on the first end section 14A of the power unit 14. For example, first, second and third switches (not shown) may be provided within the second end section 14B at first, second and third vertical locations designated by dotted lines 141A, 141B and 141C in FIG. 1A, which switches are actuated as the load handling assembly 12 is raised. A lowermost position of the load handling assembly 12 may also be determined via the load sensor LS indicating a zero weight.

In one embodiment, the controller 103 may comprise one or more accelerometers which may measure physical acceleration of the truck 10 along one, two or three axes. It is also contemplated that the accelerometer 1103 may be separate from the controller 103 but coupled to and in communication with the controller 103 for generating and transmitting to the controller 103 acceleration signals, see FIG. 2. For example, the accelerometer 1103 may measure the acceleration of the truck 10 in a direction of travel DT (also referred to herein as a first direction of travel) of the truck 10, which, in the FIG. 1 embodiment, is collinear with an axis X, which X axis may be generally parallel with the forks 16. The direction of travel DT or first direction of travel may be defined as the direction in which the truck 10 is moving, either in a forward or power unit first direction or a reverse or forks first direction. The accelerometer 1103 may further measure the acceleration of the truck 10 along a transverse direction TR (also referred to herein as a second direction) generally 90 degrees to the direction of travel DT of the truck 10, which transverse direction TR, in the FIG. 1 embodiment, is collinear with an axis Y. The accelerometer 1103 may also measure the acceleration of the truck 10 in a further direction transverse to both the direction of travel DT and the transverse direction TR, which further direction is generally collinear with a Z axis.

In an exemplary arrangement, the remote control device 70 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog, typically only in the power unit first direction, by a limited travel distance. The limited travel distance may be defined by an approximate travel distance, travel time or other measure. In one implementation, the truck may be driven continuously as long as an operator provides a travel request not lasting longer than a predetermined time amount, e.g., 20 seconds. After the operator no longer provides a travel request or if the travel request has been provided for more than the predetermined time period, a traction motor effecting truck movement is no longer activated and the truck is permitted to coast to a stop. The truck 10 may be controlled to travel in a generally straight direction or along a previously determined heading.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. Stopping the truck 10 may be implemented, for example, by either allowing the truck 10 to coast to a stop or by initiating a brake operation to cause the truck 10 to brake to a stop.

As an example, the controller 103 may be communicably coupled to a traction control system, illustrated as a traction motor controller 106 of the truck 10. The traction motor controller 106 is coupled to a traction motor 107 that drives at least one driven wheel 108 of the truck 10. The controller 103 may communicate with the traction motor controller 106 so as to accelerate, decelerate, adjust and/or otherwise limit the speed of the truck 10 in response to receiving a travel request from the remote control device 70. The controller 103 may also be communicably coupled to a steer controller 112, which is coupled to a steer motor 114 that steers at least one steered wheel 108 of the truck 10, wherein the steered wheel may be different from the driven wheel. In this regard, the truck 10 may be controlled by the controller 103 to travel an intended path or maintain an intended heading in response to receiving a travel request from the remote control device 70.

As yet another illustrative example, the controller 103 may also communicate with the traction controller 106 to decelerate, stop or otherwise control the speed of the truck 10 in response to receiving a travel request from the remote control device 70. Braking may be effected by the traction controller 106 by causing regenerative braking or activating a mechanical brake 117 coupled to the traction motor 107, see FIG. 2. Still further, the controller 103 may be communicably coupled to other vehicle features, such as main contactors 118, and/or other outputs 119 associated with the truck 10, where applicable, to implement desired actions in response to implementing remote travel functionality.

According to various aspects of the present disclosure, the controller 103 may communicate with the receiver 102 and with the traction controller 106 to operate the truck 10 under remote control in response to receiving travel commands from the associated remote control device 70.

Correspondingly, if the truck 10 is moving in response to a command received by remote wireless control, the controller 103 may dynamically alter, control, adjust or otherwise affect the remote control operation, e.g., by stopping the truck 10, changing the steer angle of the truck 10, or taking other actions. Thus, the particular vehicle features, the state/condition of one or more vehicle features, vehicle environment, etc., may influence the manner in which controller 103 responds to travel requests from the remote control device 70.

The controller 103 may refuse to acknowledge a received travel request depending upon predetermined condition(s), e.g., that relate to environmental or operational factor(s). For example, the controller 103 may disregard an otherwise valid travel request based upon information obtained from one or more of the sensors 58, 76. As an illustration, according to various aspects of the present disclosure, the controller 103 may optionally consider factors such as whether an operator is on the truck 10 when determining whether to respond to a travel command from the remote control device 70. As noted above, the truck 10 may comprise at least one presence sensor 58 for detecting whether an operator is positioned on the truck 10. In this regard, the controller 103 may be further configured to respond to a travel request to operate the truck 10 under remote control when the presence sensor(s) 58 designate that no operator is on the truck 10. Thus, in this implementation, the truck 10 cannot be operated in response to wireless commands from the transmitter unless the operator is physically off of the truck 10. Similarly, if the object sensors 76 detect that an object, including the operator, is adjacent and/or proximate to the truck 10, the controller 103 may refuse to acknowledge a travel request from the transmitter 70. Thus, in an exemplary implementation, an operator must be located within a limited range of the truck 10, e.g., close enough to the truck 10 to be in wireless communication range (which may be limited to set a maximum distance of the operator from the truck 10). Other arrangements may alternatively be implemented.

Any other number of reasonable conditions, factors, parameters or other considerations may also/alternatively be implemented by the controller 103 to interpret and take action in response to received signals from the transmitter.

Upon acknowledgement of a travel request, the controller 103 interacts with the traction motor controller 106, e.g., directly or indirectly, e.g., via a bus such as the CAN bus 110 if utilized, to advance the truck 10 by a limited amount. Depending upon the particular implementation, the controller 103 may interact with the traction motor controller 106 and optionally, the steer controller 112, to advance the truck 10 by a predetermined distance. Alternatively, the controller 103 may interact with the traction motor controller 106 and optionally, the steer controller 112, to advance the truck 10 for a period of time in response to the detection and maintained actuation of a travel control on the remote control device 70. As yet another illustrative example, the truck 10 may be configured to jog for as long as a travel control signal is received. Still further, the controller 103 may be configured to "time out" and stop the travel of the truck 10 based upon a predetermined event, such as exceeding a predetermined time period or travel distance regardless of the detection of maintained actuation of a corresponding control on the remote control device 70.

The remote control device 70 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that a wirelessly received signal is a stop signal, the controller 103 sends a signal to the traction controller 106 and/or other truck component to bring the truck 10 to a rest. As an alternative to a stop signal, the second type signal may comprise a "coast signal" or a "controlled deceleration signal" designating that the truck 10 should coast, eventually slowing to rest.

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation. It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the traction controller 106 to brake via regenerative braking or applying the mechanical brakes 117 to stop the truck 10.

Calculating Vehicle Drive Parameter(s) for Use During Remote Control Operation of Vehicle As noted above, an operator may stand on the platform 32 within the operator's station 30 to manually operate the truck 10, i.e., operate the truck in a manual mode. The operator may steer the truck 10 via the handle 52, see FIG. 1B, and, further, may cause the truck 10 to accelerate via rotation of the travel switch 54. As also noted above, rotation of the travel switch 54 forward and upward will cause the truck 10 to move forward, e.g., power unit first, at an acceleration that may be proportional to the amount of rotation of the travel switch 54. Similarly, rotating the travel switch 54 toward the rear and downward of the truck 10 will cause the truck 10 to move in reverse, e.g., forks first, at an acceleration that may be proportional to the amount of rotation of the travel switch 54. Rotation of the travel switch 54 forward and upward while the truck 10 is moving in the forks first direction will cause the truck 10 to brake. Also, rotating the travel switch 54 toward the rear and downward while the truck 10 is moving in the power unit first direction will cause the truck 10 to brake. Hence, "manual operation of the vehicle by an operator" occurs when an operator is standing on the platform 32 within the operator's station 30 and steering the truck 10 via the handle 52 and accelerating/braking (i.e., regenerative braking) the truck 10 via rotation of the travel switch 54. A separate brake switch, for example switch 41 of FIG. 1B, can be used by the operator to cause regenerative braking of the truck 10. As noted above, braking may also be effected via the mechanical brake 117.

As also noted above, the controller 103 may communicate with the receiver 102 and with the traction controller 106 to operate the truck 10 under remote control in response to receiving travel commands from the associated remote control device 70. The travel request is used to initiate a request to the truck 10 to travel by a predetermined amount, e.g., to cause the truck 10 to advance or jog in the first direction of travel, i.e., in the power unit first direction, by a limited travel distance. Hence, the operator may operate the truck 10 in a remote control mode when the operator is not physically present on the truck but is walking near the truck 10 such as during a picking operation, i.e., when the operator is located off the truck 10 and picking or gathering pick items from warehouse storage areas to be loaded on the truck 10, using the remote control device 70 to operate the truck 10 under remote control. Operating the truck 10 in the remote control mode is also referred to herein as "semi-automated" operation of the truck 10.

When an operator is using the truck 10, such as during a picking operation within a warehouse, the operator typically uses the truck 10 in both the manual mode and the remote control mode. There can be multiple, distinct manual operations of the truck 10 in-between remote control operations, also referred to herein as semi-automated operations of the truck 10. Each such manual operation can include lifting a load, lowering a load, and/or driving the truck 10 forward or backward and steering.

Previously, a vehicle controller stored a predefined, fixed vehicle parameter, e.g., a maximum acceleration, to limit the maximum acceleration of the vehicle during operation of the vehicle in the remote control mode. This predefined maximum acceleration limit was sometimes too high, e.g., if the truck was being loaded with a tall stack of articles/packages defining loads that were unstable, and too low if the truck was being loaded with a short stack of articles/packages defining loads that were stable.

In accordance with the present disclosure, the controller 103 monitors at least one drive parameter during recent manual operations of the truck 10. In some embodiments, the controller 103 can monitor one or more drive parameters, which one or more drive parameters correspond to a driving behavior or trait of an operator of the truck 10 prior to receiving a request from the operator to implement a semi-automated driving operation. The recent manual operations of the truck 10 may include, for example, the two most recent manual operations, the three most recent manual operations or the four (or more) most recent manual operations. If the one or more drive parameters are high, this may correspond to the operator driving the truck 10 briskly. If the one or more drive parameters are low, this may correspond to the operator driving the truck 10 conservatively or cautiously.

Instead of using one or more predefined, fixed drive parameters for vehicle control during remote control operation of the truck 10, the present disclosure calculates one or more adaptive drive parameters for use by the controller 103 during a next remote control operation of the truck 10 based on the one or more drive parameters monitored during the two or more most recent manual operations of the truck 10. Since the one or more drive parameters calculated for use in the next remote control operation of the truck 10 are based on recent driving behavior of the operator, i.e., the one or more drive parameters monitored during the more recent manual mode operations of the truck 10, it is believed that the present embodiments more accurately and appropriately define the one or more drive parameters to be used during a next remote control operation of the truck 10 such that the one or more drive parameters more closely match to the recent driving behavior of the operator.

Figure 3:
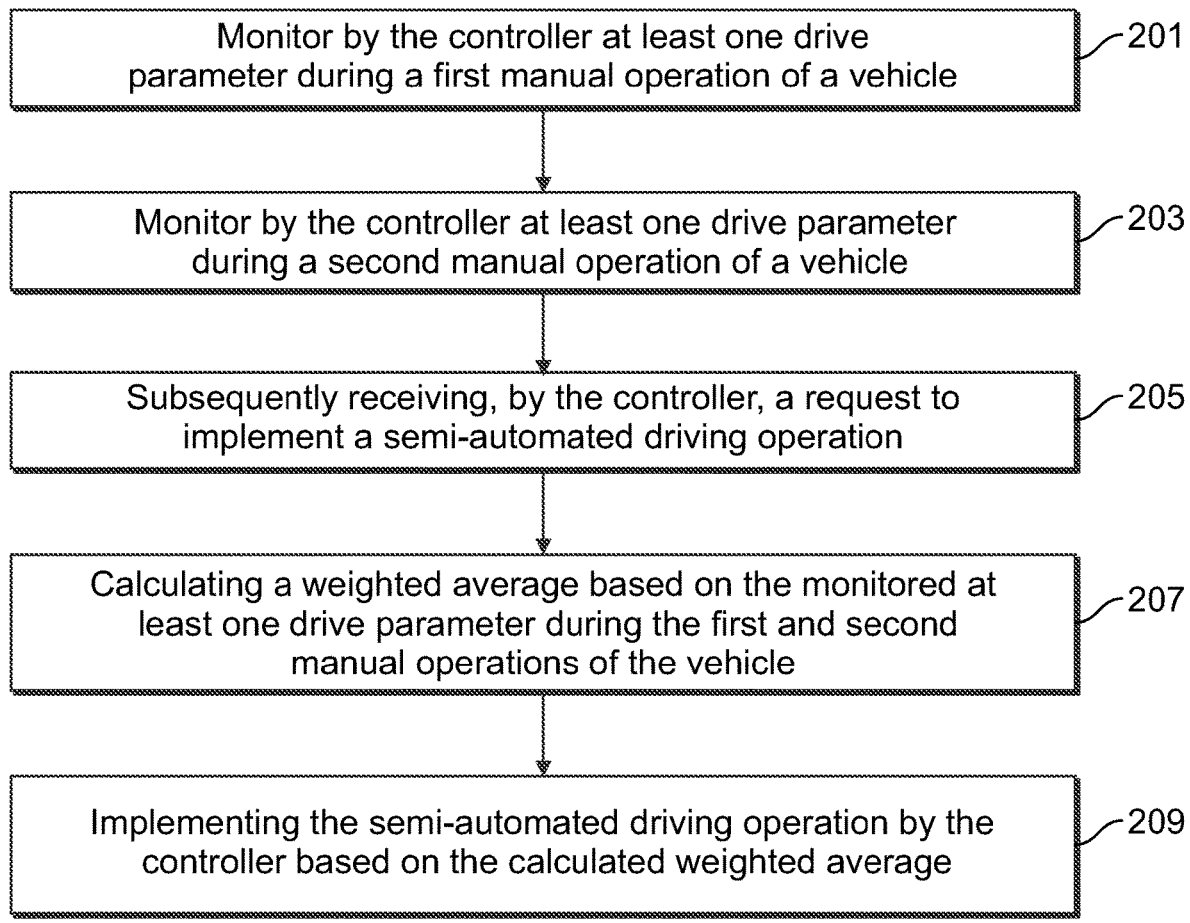
FIG. 3 depicts a flowchart of an example algorithm for monitoring at least one drive parameter during first and second manual operations of the vehicle, calculating a weighted average, and, based on the weighted average, controlling implementation of a semi-automated driving operation.

An example control algorithm, or process, for the controller 103 is illustrated in FIG. 3 for monitoring at least one drive parameter, or in some embodiments, first and second drive parameters, e.g., acceleration in first and second directions, during recent manual operations of the truck 10 to be used in part to calculate a corresponding adaptive drive parameter, e.g., a maximum acceleration, to be used by the controller 103 when the truck 10 is next operated in the remote control mode. While the example control algorithm of FIG. 3 can include monitoring first and second drive parameters, monitoring of only a first drive parameter (e.g., acceleration in a direction of travel of the truck 10) without monitoring the second drive parameter is contemplated as well.

In step 201, the controller 103 monitors, during a first manual operation of the vehicle, at least a first drive parameter, e.g., a first acceleration, corresponding to a first direction of travel of the vehicle or truck 10. Concurrently, the controller 103 can also monitor a second drive parameter, e.g., a second acceleration, corresponding to a second direction, which is different from the first direction of travel. In one embodiment, the first direction of travel may be defined by the direction of travel DT of the truck 10, see FIG. 1, and the second direction may be defined by the transverse direction TR. Hence, the first and second directions may be substantially orthogonal to one another.

In step 203, the controller 103 monitors, during a second manual operation of the vehicle, at least the first drive parameter, e.g., the first acceleration, corresponding to the first direction of travel of the vehicle or truck 10. As stated above, the controller 103 can also concurrently monitor the second drive parameter, e.g., the second acceleration, corresponding to the second direction, which is different from the first direction of travel.

The controller 103 stores data regarding the monitored at least one drive parameter (e.g., the first vehicle drive parameter and possibly the second vehicle drive parameter) corresponding to the first manual operation of the truck 10 as well as data related to those monitored drive parameters during the second manual operation. Steps 201 and 203 can be repeated so that data regarding the at least one drive parameter, and possibly the second drive parameter, can be collected during one or more previous, but recent, manual operations of the truck 10. As described below, the stored data from the most recent manual operation as well as other recent manual operations can be used to calculate a weighted average for controlling implementation of a semi-automated driving operation.

Because the steps 201 or 203 can be repeated for other manual operations of the truck 10, the term "current manual operation" can refer to a manual operation that is currently taking place, the term "most recent manual operation" can refer to a manual operation occurring immediately prior to the current manual operation that is still taking place, the term "previous manual operation" can refer to a manual operation occurring prior to the most recent manual operation, and the term "next manual operation" can refer to a manual operation occurring subsequent to the current manual operation. These terms refer to manual operations of the truck 10 which are relative to one another. For example, the first manual operation referred to in step 201 is a previous manual operation relative to the second manual operation referred to in step 203 after the second manual operation has been completed. However, while the first manual operation is being performed it is also the "current manual operation" until it is stopped and the second manual operation begins. Once the "current manual operation" ends it can be considered to be the "most recent manual operation" and data collected or acquired during that manual operation can be used as described more fully below.

Figure 4:
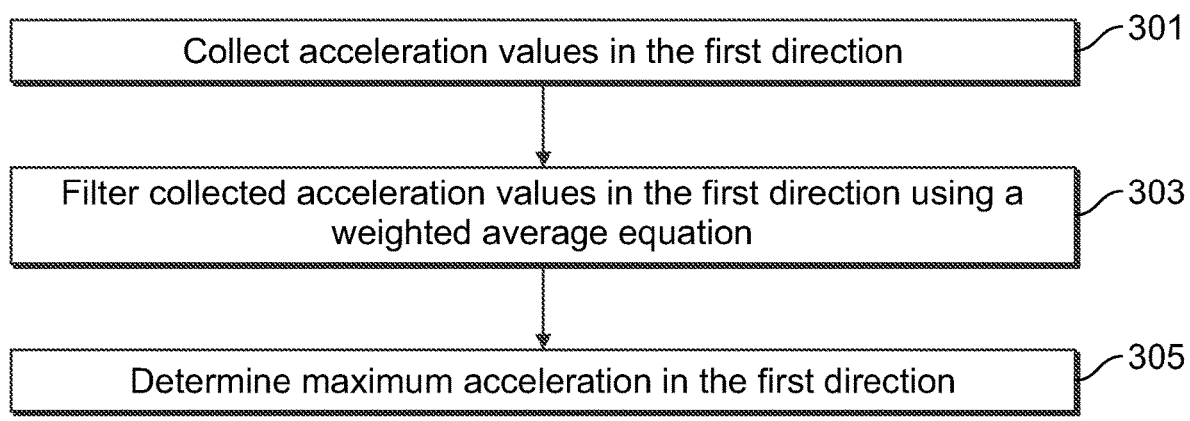
FIG. 4 depicts a flowchart of an example algorithm for calculating a first value indicative of acceleration of the vehicle in a first direction during a most recent manual operation of the vehicle.

Departing (for now) from FIG. 3, in order to provide a description of steps 201 and 203, FIG. 4 depicts an algorithm of an example method for performing either of steps 201 and 203. In the illustrated embodiment of FIG. 4, only a first drive parameter (e.g., acceleration in a first direction) is monitored.

An operator may vary acceleration of the truck 10 based on factors such as the curvature of the path along which the truck 10 is being driven, the turning angle of the truck 10, the current floor conditions, e.g., a wet/slippery floor surface or a dry/non-slippery floor surface, and/or the weight and height of any load being carried by the truck 10. For example, if the truck 10 is being driven without a load or with a stable load, e.g., the load has a low height, over a long, straight path, on a dry/non-slippery floor surface, then values for the first acceleration may be high. However, if the truck 10 has an unstable load, e.g., the load has a high height, such that the load may shift or fall from the truck 10 if the truck 10 is accelerated quickly, then values for the first acceleration may be low. Also, if the truck 10 is being turned at a sharp angle and driven at a high speed, then values for the first acceleration may be high and values for the second acceleration may also be high.

In the example control algorithm, or process, for the controller 103 illustrated in FIG. 4, a first value indicative of acceleration of the truck 10 in the first direction is calculated for the most recent manual operation of the truck 10 (whether that most recent manual operation is the first manual operation referred to in step 201 or the second manual operation referred to in step 203).

In step 301, a sequence of acceleration values in the first direction from the accelerometer 1103 are collected during the most recent manual operation of the vehicle, wherein the first direction is defined by the direction of travel DT of the truck 10, i.e., the direction in which the truck 10 is moving, either in a forward or power unit first direction or a reverse or forks first direction, and stored in memory by the controller 103. Rotation of the travel switch 54 forward and upward will cause the truck 10 to move forward, e.g., power unit first, at a positive acceleration in the power unit first direction proportional to the amount of rotation of the travel switch 54. Similarly, rotating the travel switch 54 toward the rear and downward of the truck 10 will cause the truck 10 to move in reverse, e.g., forks first, at a positive acceleration in the forks first direction proportional to the amount of rotation of the travel switch 54. As the truck 10 accelerates in either the power unit first direction or the forks first direction, both considered the first direction as defined by the direction of travel DT of the truck 10, the accelerometer 1103 generates a sequence of positive acceleration values that are stored in memory by the controller 103. Rotation of the travel switch 54 forward and upward while the truck 10 is moving in the forks first direction will cause the truck 10 to decelerate or brake. Also, rotating the travel switch 54 toward the rear and downward while the truck 10 is moving in the power unit first direction will cause the truck 10 to decelerate or brake. In accordance with a first embodiment of the present disclosure, negative acceleration values, such as occurring during braking, are not collected for use in calculating the first value indicative of acceleration of the truck 10 in the first direction during the most recent manual operation of the vehicle.

While rotation of the travel switch 54 forward and upward will cause the truck 10 to move forward, i.e., power unit first, at a positive acceleration (speed is increasing) in the power unit first direction, the accelerometer may determine that such movement comprises a positive acceleration. The accelerometer may also determine that braking (speed is decreasing), while the truck 10 is traveling in the power unit first direction, comprises deceleration or negative acceleration. Further, while rotating the travel switch 54 toward the rear and downward will cause the truck 10 to move in reverse, e.g., forks first, at a positive acceleration (speed is increasing) in the forks first direction, the accelerometer may determine that such movement where the speed is increasing in the forks first direction comprises a negative acceleration. The accelerometer may also determine that braking (speed is decreasing) while the truck 10 is traveling in the forks first direction comprises a positive acceleration. However, for purposes of the discussion herein of a control algorithm for calculating a maximum acceleration to be used during a next semi-automated driving operation, acceleration and deceleration during movement of the truck 10 in the power unit first direction and the forks first direction will be defined as follows: rotation of the travel switch 54 forward and upward causing the truck 10 to move forward, e.g., power unit first, is defined as a positive acceleration (speed is increasing) in the power unit first direction; rotating the travel switch 54 toward the rear and downward causing the truck 10 to move in reverse, e.g., forks first, is defined as a positive acceleration (speed is increasing) in the forks first direction; rotation of the travel switch 54 forward and upward or actuating the brake switch 41 while the truck 10 is moving in the forks first direction causing the truck 10 to decelerate or brake (speed is decreasing) is defined as a negative acceleration or deceleration; and rotation of the travel switch 54 toward the rear and downward or actuation of the brake switch 41 while the truck 10 is moving in the power unit first direction causing the truck 10 to decelerate or brake (speed is decreasing) is defined as a negative acceleration or deceleration.

As noted above, in accordance with a first embodiment of the present disclosure, negative acceleration values, such as occurring during braking in either the power unit first direction or the forks first direction, are not collected for use in calculating the first value indicative of acceleration of the truck 10 in the first direction during the most recent manual operation of the vehicle. However, in accordance with a second embodiment of the present disclosure, both positive acceleration values (where the speed of the truck is increasing in either the power unit first or the forks first direction) and negative acceleration values (where the speed of the truck is decreasing in either the power unit first or the forks first direction) are collected and used in calculating the first value indicative of acceleration of the truck 10 in the first direction during the most recent manual operation of the vehicle. In the second embodiment where negative acceleration values are collected, the absolute value of the negative acceleration values are used in the described equations and calculations set out below. Accordingly, while some embodiments of the present disclosure may ignore any negative acceleration data, other embodiments can consider such data by using the absolute value of the negative acceleration data in the described equations and calculations.

In step 303, the acceleration values in the first direction collected during the most recent manual operation of the truck 10 are filtered with a weighted average equation so as to make maximum outliers less weighted and effect smoothing. Example equation 1, set out below, may be used to filter the collected acceleration values in the first direction to calculate weighted average values based on the collected acceleration values in the first direction from the most recent manual operation of the truck 10. Each of the weighted average values can, thus, be considered to be a respective processed value related to the acceleration values in the first direction collected during the most recent manual operation of the truck 10 (i.e., a respective processed value related to the first monitored vehicle drive parameter).

$$wa_{x-(i+1)} = \frac{wa_{y-i} * g_1 + a_{y\_[(i*m)+1]} * g_2 + a_{y\_[(i*m)+2]} * g_3 + a_{y\_[(i*m)+3]} * g_4}{\left(\sum g_s\right)}$$ Equation 1

$wa_{x-(i+1)}$=a processed value comprising a calculated weighted average in a first direction (e.g., "x"); where i=1 ... (n−1) and n is the total number of subsets into which the individual collected acceleration values, $a_{x\_j}$, are grouped;

$wa_{x-i}$; where i=1 ... n; $wa_{x-i}$=a processed value comprising an arithmetic average of the first three "start" acceleration values in the first direction for the first calculation and thereafter a most recent weighted average;

$g_s$=weighting factor where s=1 ... m+1, where m is the number of members in each subset;

$g_1$=weighting factor of $wa_{x-i}$; in the illustrated embodiment, $g_1$=3, but could be any value;

$g_2$, $g_3$, $g_4$=additional weighting factors=1, but could be any value and is typically less than $g_1$;

$a_{x\_[(i*m)+1]}$, $a_{x\_[(i*m)+2]}$, $a_{x\_[(i*m)+3]}$, where i=1 ... (n−1); $a_{x\_[(i*m)+1]}$, $a_{x\_[(i*m)+2]}$, $a_{x\_[(i*m)+3]}$=three adjacent individual acceleration values in the first direction, defining a subset, collected during the most recent manual operation of the truck 10. The subset could comprise more than three or less than three acceleration values. The first three collected acceleration values ($a_{x\_1}$, $a_{x\_2}$, and $a_{x\_3}$) make up a first subset as well.

The first "start" acceleration values in the first direction could comprise less than three or more than three values and the number of members in each subset "m" could likewise comprise less than three or more than three members.

For purposes of illustration, sample calculations will now be provided based on non-real sample values, which simulate collected acceleration values in the first direction, and are set out in Table 1 of FIG. 5. All of the acceleration values set out in Table 1 are positive values. However, as noted above, negative acceleration values could be collected and used as well. As further noted above, where negative acceleration values are collected, the absolute value of the negative acceleration values are used in the described equations and calculations set out below.

$wa_{x-1}$ = arithmetic average of the first three "start" acceleration values =

$$\frac{a_{x\_1} + a_{x\_2} + a_{x\_3}}{m} = \frac{1 + 2 + 4}{3} = 2.33$$

$wa_{x-2}$ = first weighted average value =

$$\frac{g_1 * wa_{x-1} + g_2 * a_{x\_4} + g_3 * a_{x\_5} + g_4 * a_{x\_6}}{\sum g_s} =$$

$$\frac{3 * 2.33 + 1 * 8 + 1 * 3 + 1 * 2}{6} = 3.33$$

$wa_{x-3}$ = second weighted average value =

$$\frac{g_1 * wa_{x-2} + g_2 * a_{x_7} + g_3 * a_{x_8} + g_4 * a_{x_9}}{\sum g_s} =$$

-continued $$\frac{3 * 3.33 + 1 * 1 + 1 * 0 + 1 * 0}{6} = 1.83$$

The remaining weighted average values based on the sample values set out in Table 1 of FIG. 5 are calculated in a similar manner. The results are set out in Table 2 of FIG. 6.

Figures 6, 7, 8:
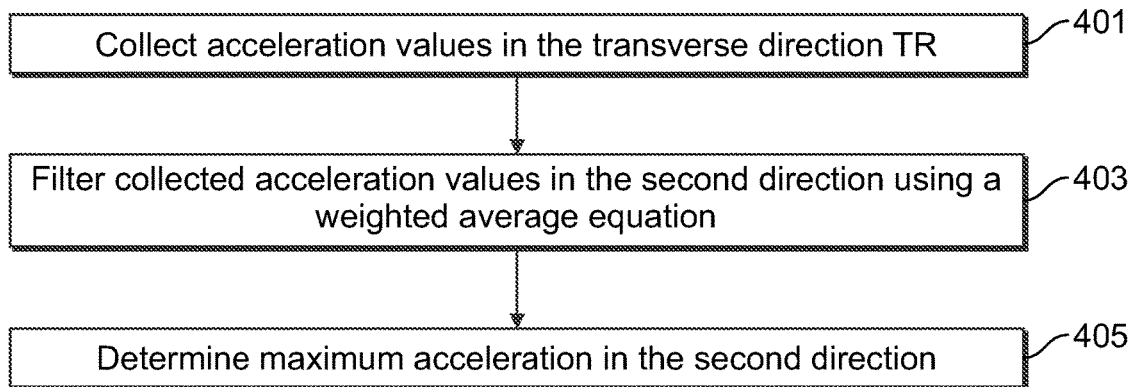
FIG. 6 illustrates a table containing sample values of $wa_{x-i}$.
FIG. 7 depicts a flowchart of an example algorithm for calculating a second value indicative of acceleration of the vehicle in a second direction during a most recent manual operation of the vehicle.
FIG. 8 illustrates a table containing non-real sample acceleration values in the second direction corresponding to a most recent manual operation of the vehicle.

Thus, with respect to Equation 1, the values $a_{x\_[(i*m)+1]}$, $a_{x\_[(i*m)+2]}$, and $a_{x\_[(i*m)+3]}$ are used in the calculation of a weighted average value $wa_{x-(i+1)}$. According to the example of FIG. 5, "i" can range from 1 to 9, but for purposes of Equation 1, "i" ranges from 1 to 8. Accordingly, the 27 individual collected acceleration values (i.e., $a_{x\_j}$, where "j" ranges from 1 to k, where k=27 in the table of FIG. 5) can be arranged as 9 distinct subsets each having 3 elements. Other than the first subset, which, as noted above, comprise an arithmetic average of the first three "start" acceleration values in the first direction, for each of the subsequent 8 subsets, a weighted average is calculated according to Equation 1. The example initial arithmetic average and the example 8 weighted averages are shown in FIG. 6. One of ordinary skill will readily recognize that the subset size of 3 values is merely an example and that utilizing 9 subsets is an example amount as well.

In step 305 of FIG. 4, a maximum acceleration in the first direction defined by the direction of travel DT of the truck 10 is determined for the most recent manual operation using example Equation 2, set out below:

$a_{x-wa-max}$=maximum acceleration in the first direction=max($wa_{x-i}$)=maximum value of the processed values or, in other words, the maximum value of the initial arithmetic and weighted averages ($wa_{x-i}$) calculated. Equation 2:

Based on the results from Table 2 of FIG. 6, max($wa_{x-i}$)= $a_{x-8}$=3.82.

It is noted that $a_{x-wa-max}$ may be selected from any number of initial arithmetic and weighted average values ($wa_{x-i}$) calculated for the most recent manual operation. For example, the average values ($wa_{x-i}$) calculated during a predetermined time period, e.g., the last ten seconds, may be considered. It is also contemplated that a predetermined number of initial arithmetic and weighted average values ($wa_{x-i}$) calculated, e.g., 25 average values, without taking time into account, may be considered. It is further contemplated that all of the initial arithmetic and weighted average values ($wa_{x-i}$) calculated during the entirety of the most recent manual operation of the truck 10 may be considered. In the illustrated example, nine (9) values of initial arithmetic and weighted averages ($wa_{x-i}$) were considered. However, less than 9 or greater than 9 values of initial arithmetic and weighted averages ($wa_{x-i}$) can be considered when selecting max($a_{x-wa-i}$)=maximum value of the initial arithmetic and weighted averages ($wa_{x-i}$) calculated, which defines the $a_{x-wa-max}$=maximum acceleration in the first direction. The maximum acceleration in the first direction ($a_{x-wa-max}$) defines a first value indicative of acceleration of the vehicle in the first direction during the most recent manual operation of the vehicle. Instead of selecting the maximum or highest value from the set of initial arithmetic and weighted average values ($wa_{x-i}$) considered as the maximum acceleration in the first direction $a_{x-wa-max}$, it is contemplated that a second or a third highest value of the initial arithmetic and weighted average values ($wa_{x-i}$) considered may be selected as the maximum acceleration in the first direction $a_{x-wa-max}$. It is further contemplated that the set of initial arithmetic and weighted average values ($wa_{x-i}$) considered may be averaged to determine the maximum acceleration (during the most recent manual operation) in the first direction $a_{x-wa-max}$.

As noted above, a second drive parameter can also be monitored in either of steps 201 and 203. An example control algorithm, or process, for the controller 103 is illustrated in FIG. 7 for calculating a second value indicative of acceleration of the truck 10 in the second direction during the most recent manual operation of the truck 10. In step 401, a sequence of acceleration values in the second direction from the accelerometer 1103 are collected, wherein the second direction is defined by the transverse direction TR, see FIG. 1, and stored in memory by the controller 103.

In step 403, the collected acceleration values in the second direction collected during the most recent manual operation of the truck 10 are filtered with a weighted average equation so as to make maximum outliers less weighted and effect smoothing. Example equation 3, set out below, may be used to filter the collected acceleration values in the second direction during the most recent manual operation of the truck 10. Each of the weighted average values can, thus, be considered to be a respective processed value related to the acceleration values in the second direction collected during the most recent manual operation of the truck 10 (i.e., a respective processed value related to the second monitored vehicle drive parameter.)

$$wa_{y-(i+1)} = \frac{wa_{y-i} * g_1 + a_{y\_[(i*m)+1]} * g_2 + a_{y\_[(i*m)+2]} * g_3 + a_{y\_[(i*m)+3]} * g_4}{\sum_s g_s} \quad \text{Equation 3}$$

$wa_{y-(i+1)}$=a processed value comprising a calculated weighted average in a second direction (e.g., "y"); where i=1 ... (n−1) and n is the total number of subsets into which the individual collected acceleration values, $a_{y\_j}$, are grouped;

$wa_{y-i}$; where i=1 ... n; $wa_{y-i}$=a processed value comprising an arithmetic average of the first three "start" acceleration values in the second direction for the first calculation and thereafter the most recently calculated weighted average during the most recent manual operation;

$g_s$=weighting factor where s=1 ... m+1, where m is the number of members in each subset;

$g_1$=weighting factor of $wa_{y-i}$; in the illustrated embodiment, $g_1$=3, but could be any value;

$g_2$, $g_3$, $g_4$=additional weighting factors=1, but could be other values;

$a_{y\_[(i*m)+1]}$, $a_{y\_[(i*m)+2]}$, $a_{y\_[(i*m)+3]}$; where i=1 ... (n−1); $a_{y\_[(i*m)+1]}$, $a_{y\_[(i*m)+2]}$, $a_{y\_[(i*m)+3]}$=three adjacent individual acceleration values in the second direction, defining a subset, collected during the most recent manual operation of the truck 10. The subset could comprise more than three or less than three acceleration values. The first three collected acceleration values ($a_{y\_1}$, $a_{y\_2}$, and $a_{y\_3}$) make up a first subset as well.

The first "start" acceleration values in the second direction could comprise less than three or more than three values and the number of members in each subset "m" could likewise comprise less than three or more than three members.

For purposes of illustration, sample calculations will now be provided based on non-real sample values, which simulate collected acceleration values in the second direction, and are set out in Table 3 of FIG. 8.

$wa_{y-1}$ = arithmetic average of the first three "start" accceleration values $$\text{in the second direction} = \frac{a_{y\_1} + a_{y\_2} + a_{y\_3}}{m} = \frac{0.25 + 0.49 + 0.52}{3} = 0.42$$

$wa_{y-2}$ = first weighted average value =

$$\frac{wa_{y-1} * g_1 + a_{y\_4} * g_2 + a_{y\_5} * g_3 + a_{y\_6} * g_4}{\sum_s g_s} =$$

$$\frac{3 * 0.42 + 1 * 0.54 + 1 * 0.75 + 1 * 0.72}{6} = 0.55$$

The remaining weighted average values based on the sample values set out in Table 3 of FIG. 8 are calculated in a similar manner. The results are set out in Table 4 of FIG. 9.

In step 405 of FIG. 7, a maximum acceleration (for the most recent manual operation) in the second direction defined by the transverse direction TR of the truck 10 is determined using Equation 4, set out below:

$a_{y-wa-max}$=maximum acceleration in the second direction=max($wa_{y-i}$)=maximum value of the processed values, or, in other words, the maximum value of the initial arithmetic and weighted averages ($wa_{y-i}$) calculated.     Equation 4

Based on the results from Table 4 of FIG. 9, max($wa_{y-i}$)= $wa_{y-2}$=0.55.

It is noted that $a_{y-wa-max}$ may be selected from the initial arithmetic average or any number of weighted averages ($wa_{y-(i+1)}$) calculated. For example, the initial arithmetic and weighted average values ($wa_{y-i}$) calculated during a predetermined time period, e.g., the last ten seconds, may be considered. It is also contemplated that a predetermined number of the initial arithmetic and weighted average values ($wa_{y-i}$) calculated, e.g., 25 average values, without taking time into account, may be considered. It is further contemplated that all of the initial arithmetic and weighted average values ($wa_{y-i}$) calculated during the entirety of the most recent manual operation of the truck 10 may be considered. In the illustrated example, three (3) values of the initial arithmetic and weighted averages ($wa_{y-i}$) were considered. However, less than 3 or greater than 3 values of the initial arithmetic and weighted averages ($wa_{y-i}$) can be considered when selecting max($wa_{y-i}$)=maximum value of the initial arithmetic and weighted averages ($wa_{y-i}$) calculated, which defines the $a_{y-wa-max}$=maximum acceleration in the second direction. The maximum acceleration of the vehicle in the second direction ($a_{y-wa-max}$) defines the second value indicative of acceleration of the vehicle in the second direction during the most recent manual operation of the vehicle.

By repeating steps 201 and 203 for multiple manual operations, respective first and second values $a_{x-wa-max}$ and $a_{y-wa-max}$ indicative of acceleration of the vehicle in the first and second directions can be calculated for each of the multiple manual operations. For purposes of illustration, sample calculations will now be provided based on non-real sample values, which simulate calculated maximum acceleration values in the first and second directions, which are first and second values indicative of acceleration of the vehicle in the first and second directions, and are set out in FIG. 10 and FIG. 11.

In FIG. 10, there are 4 example values for $a_{x-wa-max}$ corresponding to the four most recent manual operations of the truck 10. As noted above, $a_{x-wa-max}$, can comprise the maximum of all of the different processed values calculated during a particular manual operation. The label $a_{x-wa-max-1}$ in the left-most column refers to the calculated maximum acceleration value in the first direction during the most recent manual operation of the truck 10. The label $a_{x-wa-max-2}$ in the second column refers to the calculated maximum acceleration value in the first direction during an immediately-previous manual operation of the truck 10. The label $a_{x-wa-max-3}$ in the third column refers to the calculated maximum acceleration value in the first direction during a second-most-previous manual operation of the truck 10. The label $a_{x-wa-max-4}$ in the right-most column refers to the calculated maximum acceleration value in the first direction during a third-most-previous manual operation of the truck 10. Thus, when a current manual operation ends and, therefore, becomes the most recent manual operation, the value $a_{x-wa-max}$ calculated for that most recent manual operation is placed in the left-most column of FIG. 10 and the 4 values are shifted to the right thereby removing the oldest value from the table. The example table of FIG. 10 includes 4 elements but one of ordinary skill will recognize that embodiments of the present disclosure contemplate more or less than 4 such values and, for example, could include all manual operations occurring prior to the next semi-automated operation.

In FIG. 11, there are 3 example values for $a_{y-wa-max}$ corresponding to the three most recent manual operations of the truck 10. The label $a_{y-wa-max-1}$ in the left-most column refers to the calculated maximum acceleration value in the second direction during the most recent manual operation of the truck 10. The label $a_{y-wa-max-2}$ in the second column refers to the calculated maximum acceleration value in the second direction during an immediately-previous manual operation of the truck 10. The label $a_{y-wa-max-3}$ in the third column refers to the calculated maximum acceleration value in the second direction during a second-most-previous manual operation of the truck 10. Thus, when a current manual operation ends and, therefore, becomes the most recent manual operation, the value $a_{y-wa-max}$ calculated for that most recent manual operation is placed in the left-most column of FIG. 11 and the 3 values are shifted to the right thereby removing the oldest value from the table. The example table of FIG. 11 includes 3 elements but one of ordinary skill will recognize that embodiments of the present disclosure contemplate more or less than 3 such values and, for example, could include all manual operations occurring prior to the next semi-automated operation.

Returning now to the algorithm or process of FIG. 3, a request to implement a semi-automated driving operation of the truck 10 is received by the controller, in step 205. The receipt of this request may occur subsequent to the steps 201 and 203 occurring such that acceleration-related data values, such as those example values in the tables of FIG. 10 and FIG. 11, have been calculated and stored by the controller.

In step 207, a weighted average is calculated using the monitored at least one drive parameter from the multiple, distinct manual operations of the truck 10. While the example process of FIG. 3 explicitly refers to only a first manual operation and a second manual operation occurring, the example data from the table of FIG. 10 refers to four recent manual operations of the truck 10. Thus, in step 207, the four example processed values of the table of FIG. 10 corresponding to the maximum acceleration of the vehicle in the first direction ($a_{x-wa-max}$) for each of the four most recent manual operations of the vehicle can be used to calculate an overall weighted average of the maximum acceleration of the vehicle in the first direction, $a_{x-next\_QPR}$ for the four most recent manual operations, according to Equation 5, which is as follows:

$$a_{x-next\_QPR} = \frac{a_{x-wa-max-1} * g_1 + a_{x-wa-max-2} * g_2 + a_{x-wa-max-3} * g_3 + a_{x-wa-max-4} * g_4}{\sum g_s}$$

where
$g_s$=weighting factor where s=1 . . . 4 (in this example); and
$g_1$, $g_2$, $g_3$, $g_4$=weighting factors to be applied to the corresponding maximum acceleration values (each of which is also a weighted average) of the vehicle in the first direction ($a_{x-wa-max}$). As one example, $g_1$ can equal 4, $g_2$ can equal 2, $g_3$ can equal 1.5 and $g_4$ can equal 1. Each of $g_1$, $g_2$, $g_3$, $g_4$ could equal any value. Maximum acceleration values $a_{x-wa-max-1}$; $a_{x-wa-max-2}$; $a_{x-wa-max-3}$; $a_{x-wa-max-4}$ times their corresponding weighting factors $g_1$, $g_2$, $g_3$, $g_4$ are referred to herein as first, second, third and fourth components of the overall weighted average of the maximum acceleration of the vehicle in the first direction, $a_{x-next\_QPR}$.

Using the example values and weighting factors described above, the calculated overall weighted average of the maximum acceleration of the vehicle in the first direction for the four most recent manual operations is:

$$a_{x-next\_QPR} = \frac{3.82*4 + 3.34*2 + 1.82*1.5 + 2.4*1}{8.5} = 3.19$$

Separate from step 207, the three values of the table of FIG. 11 can be used to calculate a different overall weighted average of the maximum acceleration of the vehicle in the second direction, $a_{y-next\_QPR}$ for the three most recent manual operations, according to Equation 6, which is as follows:

$$a_{y-next\_QPR} = \frac{a_{y-wa-max-1} * g_1 + a_{y-wa-max-2} * g_2 + a_{y-wa-max-3} * g_3}{\sum g_s}$$

where
$g_s$=weighting factor where s=1 . . . 3 (in this example); and
$g_1$, $g_2$, $g_3$=weighting factors to be applied to the corresponding maximum acceleration values (each of which is also a weighted average) of the vehicle in the second direction ($a_{y-wa-max}$). As one example, $g_1$ can equal 4, $g_2$ can equal 2, and $g_3$ can equal 1. Each of $g_1$, $g_2$, $g_3$ could equal any value. Maximum acceleration values $a_{y-wa-max-1}$; $a_{y-wa-max-2}$; $a_{y-wa-max-3}$ times their corresponding weighting factors $g_1$, $g_2$, $g_3$ are referred to herein as first, second and third components of the overall weighted average of the maximum acceleration of the vehicle in the second direction, $a_{y-next\_QPR}$.

Using the example values and weighting factors described above, the calculated weighted average of the maximum acceleration of the vehicle in the second direction for the three most recent manual operations is:

$$a_{y-next\_QPR} = \frac{0.55*4 + 0.10*2 + 1.2*1}{7} = 0.51$$

Although the weighting factors described above are merely provided by way of example, weighting the more recent values heavier than less recent values tends to allow the most recent manual driving behavior to have a greater impact on each of the calculated weighted averages. In the above example embodiments relating to FIG. 10 and FIG. 11, the number (i.e., 4) of the recent manual operations considered when calculating the weighted average of the maximum acceleration of the vehicle in the first direction happens to be different than the number (i.e., 3) of recent manual operations considered when calculating the weighted average of the maximum acceleration of the vehicle in the second direction. It is also contemplated that these two numbers may be the same as one another.

Finally, in step 209 of FIG. 3, the controller 103 can control implementation of a next semi-automated driving operation based, at least, in part, on the calculated weighted average $a_{x-next\_QPR}$.

Figures 12, 13:
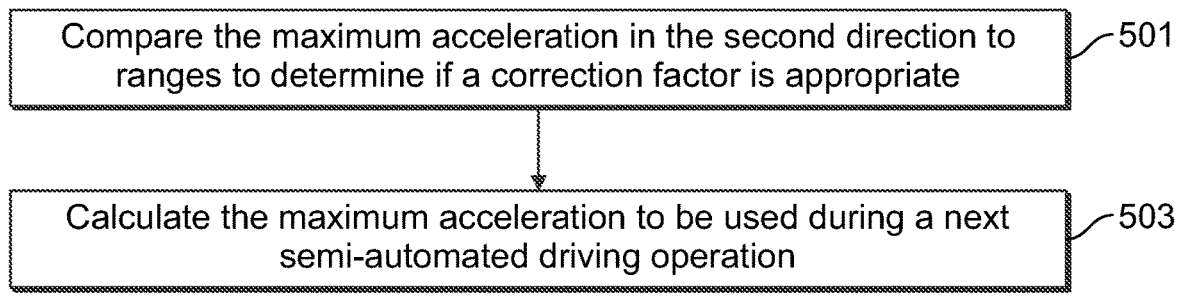
FIG. 12 depicts a flowchart of an example algorithm for calculating a maximum acceleration to be used during a next semi-automated driving operation based on calculated weighted averages indicative of acceleration of the vehicle in the first and second directions during prior manual operations of the vehicle.
FIG. 13 depicts a lookup table containing three separate ranges for the weighted average in the second direction $(a_{y-max})$.

An example control algorithm, or process, for the controller 103 is illustrated in FIG. 12 for calculating a maximum acceleration to be used during a next semi-automated driving operation based, at least in part, on the calculated overall weighted average of the maximum acceleration of the vehicle in the first direction $a_{x-next\_QPR}$. In the example process of FIG. 12, to arrive at the maximum acceleration, the calculated weighted average $a_{x-next\_QPR}$ is adjusted by a correction factor based on the other weighted average of the maximum acceleration of the vehicle in the second direction $a_{y-next\_QPR}$. These weighted averages represent first and second weighted average values indicative of acceleration of the truck 10 in the first and second directions during recent manual operations of the truck 10. As noted above, the first weighted average value indicative of acceleration of the truck 10 in the first direction is defined by the weighted average $a_{x-next\_QPR}$ and the second weighted average value indicative of acceleration of the truck 10 in the second direction is defined by the weighted average $a_{y-next\_QPR}$. During operation of the truck 10, an operator may drive the truck 10 quickly along a generally straight path, but slowly during a turn. To factor in the operator driving the truck 10 slowly during a turn, in step 501, the controller 103 compares the weighted average in the second direction ($a_{y-next\_QPR}$) to empirically determined ranges set out in a lookup table stored in memory to determine if a correction to the weighted average in the first direction ($a_{x-next\_QPR}$) is appropriate.

As explained in detail below, the weighted average in the second direction ($a_{y-next\_QPR}$) can be used to correct, or adjust, the calculated weighted average in the first direction ($a_{x-next\_QPR}$) when determining the maximum acceleration for the next semi-automated driving operation. The weighted average in the second direction ($a_{y-next\_QPR}$) is likely indicative of the operator's evaluation of the stability of the truck 10 and its current load. If the weighted average in the second direction is greater than a first empirically derived value or within an empirically derived "high acceleration" range, then that can indicate the operator believes the load is relatively stable and the maximum acceleration for the next semi-automated driving operation can be increased. However, if the weighted average in the second direction is less than a second empirically derived value or falls within an empirically defined "low acceleration" range, then that can indicate the operator believes the load could be unstable even though the calculated weighted average in the first direction is relatively high. Thus, in this second instance, the maximum acceleration for the next semi-automated driving operation can be decreased. If the weighted average in the second direction is in-between the first and the second empirically derived values or within an empirically defined medium range, then no correction, or adjustment, of the maximum acceleration for the next semi-automated driving operation is made. High, low and medium ranges (or empirically derived first and second values) can be empirically determined for a particular vehicle in a controlled environment where the vehicle is operated at various maximum accelerations in the first and second directions, various high, low and medium ranges of differing values are created and, using the weighted average values in the second direction, correction factors are determined and used to adjust the weighted average values in the first direction. Preferred high, low and medium ranges, which allow for an optimum acceleration in the first direction yet allow the truck to carry and support loads in a stable manner are selected.

An exemplary simulated lookup table based on non-real values is set out in FIG. 13, which table contains three separate ranges for the weighted average in the second direction ($a_{y-next\_QPR}$). If the weighted average acceleration in the second direction falls within either the high or the low acceleration range depicted in the lookup table of FIG. 13, a corresponding correction factor is used in determining the maximum acceleration to be used during the next semi-automated driving operation of the truck 10. If the weighted average in the second direction falls within the middle acceleration range (or mid-range) depicted in the lookup table of FIG. 13, no correction factor corresponding to the weighted average in the second direction is used in determining the maximum acceleration for use during the next semi-automated driving operation of the truck 10.

In the example discussed above, the weighted average in the second direction ($a_{y-next\_QPR}$)=0.51. This value falls within the high acceleration range, which corresponds to a correction factor of +10%.

In step 503, the maximum acceleration to be used during a next semi-automated driving operation (which may also be referred to as "a semi-automated driving operation maximum acceleration") is calculated using example Equation 7:

$$\text{max.acc} = a_{x-next\_QPR} * (1 + \text{corr}_x + \text{corr}_y) \quad \text{Equation 7:}$$

Where max.acc=the maximum acceleration to be used in the first direction during a next semi-automated driving operation;

$\text{corr}_x$=a safety margin, which could be equal to any value. In the illustrated embodiment $\text{corr}_x$=−5% (may comprise a negative value as in the illustrated embodiment to reduce max.acc to provide a safety margin);

$\text{corr}_y$=correction factor from the lookup table in FIG. 13 and is based on the weighted average in the second direction ($a_{y-next\_QPR}$).

A sample calculation for max.acc based on the sample values discussed above will now be provided.

$$\text{max.acc} = a_{x-next\_QPR} * (1 + \text{corr}_x + \text{corr}_y) = 3.19*(1 - 0.05 + 0.1) = 3.35$$

Hence, in this sample, the controller 103 communicates with the traction motor controller 106 so as to limit the maximum positive acceleration (speed is increasing) of the truck 10 in the first direction during a next semi-automated or remote control operation to 3.35 m/s².

Alternatives to the example correction factors of FIG. 13, having a mid-range and outlier ranges, are contemplated as well. For example, determining "high acceleration" in the second direction could cause a correction factor $\text{corr}_y$=0 to be applied so as not to reduce max.acc. When "medium acceleration" is determined a correction factor corr$_y$=−0.05 (i.e., 5%) can be applied to reduce max.acc to provide a safety margin and when "low acceleration" is determined a correction factor corr$_y$=−0.10 (i.e., 10%) can be applied to reduce max.acc to provide a safety margin. Furthermore, the determination of acceleration in the second direction is not limited to merely 3 distinct ranges, alternative embodiments of the present disclosure contemplate more than simply 3 gradations of ranges as well such as, for example, 4, 5 or more ranges each having a corresponding predetermined correction factor value associated therewith.

It is also contemplated that the controller 103 may calculate a first value indicative of only deceleration of the vehicle in the first direction during the one or more most recent manual operations of the vehicle using equations 1 and 2 set out above, wherein the absolute value of each deceleration value collected from the one or more most recent manual operations of the vehicle is used in calculating the first value using equations 1 and 2. Deceleration values corresponding to emergency braking, which deceleration values may have very high magnitudes, are ignored in calculating the first value indicative of deceleration of the vehicle.

In the event that the truck 10 does not have an accelerometer, acceleration values in the first and second directions can be calculated in alternative manners. For example, acceleration in the direction of travel DT or first direction can be determined using a velocity sensor, wherein a velocity sensor may be provided on a traction motor controller. The controller 103 may differentiate the velocity or speed values to calculate acceleration values. Acceleration may also be derived from the angular position of the travel switch 54 relative to a home position, which travel switch 54, as noted above, controls the acceleration/braking of the truck 10. Using the angular position of the travel switch 54 as an input into a lookup table, a truck acceleration is chosen from the lookup table which corresponds specific travel switch angular position values with specific acceleration values. Maximum velocity values may also be provided by the lookup table based on travel switch angular positions.

Acceleration in the transverse direction TR or second direction can be determined using the following equation:
acceleration$_y$=v$^2$/r
where v=truck speed; and
r=radius of a curve through which the truck moves;
The radius r may be calculated using the following equation:

r=wheelbase dimension/sin α

Where the wheelbase dimension is a fixed value and is equal to the distance from the front wheels to the rear wheels of the truck 10; and
Steering angle α, which is typically known by the controller 103 as it is the steered wheel angle.

In the description above, individual, or separate, manual vehicle driving operations are referred to. During each manual operation one or more vehicle drive parameters were monitored for each manual operation. For example, as described above, multiple acceleration values for the vehicle traveling in the first direction can be monitored and used to calculate a weighted average for each such manual operation. The respective weighted average for each of the manual operations is based on the monitored drive parameter occurring during that particular manual operation. These respective, distinct weighted averages can then be used to calculate an overall weighted average (i.e., a$_{x-next-QPR}$) for vehicle travel in the first direction.

The table of FIG. 5 represents a monitored drive parameter during a single manual operation. The controller 103, therefore, defines a beginning and an ending to each manual operation so that the data pertaining to each manual operation can remain segregated from data pertaining to a different manual operation. A particular manual operation can be considered to begin when an operator is on the truck 10, such as indicated by a presence sensor 58, and moves the truck 10 with at least a minimum speed. Alternatively, a particular manual operation can be considered to begin when a drive signal is generated via the travel switch 54 and not via the remote control device 70. It is still further contemplated that a particular manual operation can be considered to begin when the operator is located outside of the operator's station 30 and causes the truck to move via activation of a drive control switch 140 located near the top of the second end section 14B of the power unit 14 of the truck 10 (See FIG. 1A). The particular manual operation can be considered to end when the truck 10 remains stationary for at least a predetermined time period. Alternatively, the particular manual operation can be considered to end when the truck 10 is stopped and the operator exits the truck. Alternatively, the particular manual operation can be considered to end when the operator initiates a semi-automated driving operation. Also, a manual operation can be considered to end when an operator exits the platform of the truck 10 even when the truck 10 is still moving.

U.S. Provisional Patent Application No. 62/892,213, entitled "Adaptive Acceleration for Materials Handling Vehicle," filed on Aug. 27, 2019, is incorporated by reference in its entirety herein and U.S. Ser. No. 16/943,567 filed on Jul. 30, 2020 is also incorporated by reference in its entirety.

Having thus described the present application in detail and by reference to embodiments thereof, it will be apparent that modifications and variations are possible without departing from the scope defined in the appended claims.

What is claimed is:

1. A method for operating a materials handling vehicle comprising:
    monitoring, by a controller, a first vehicle drive parameter during a first manual operation of the vehicle by an operator;
    monitoring, by the controller, the first vehicle drive parameter during a second manual operation of the vehicle by the operator;
    receiving, by the controller after the first manual operation of the vehicle and the second manual operation of the vehicle, a request to implement a semi-automated driving operation;
    calculating, by the controller, a first weighted average based on the first vehicle drive parameter monitored during the first manual operation of the vehicle and the first vehicle drive parameter monitored during the second manual operation of the vehicle; and
    based at least in part on the calculated first weighted average, controlling, by the controller, implementation of the semi-automated driving operation.

2. The method of claim 1, wherein calculating the first weighted average comprises:
    calculating a first component of the first weighted average by applying a first weight value to a first processed value related to the first vehicle parameter monitored during the first manual operation of the vehicle;
    calculating a second component of the first weighted average by applying a second weight value to a second processed value related to the first vehicle parameter monitored during the second manual operation of the vehicle; and calculating the first weighted average based on the calculated first and second components.

3. The method of claim 2, wherein the first weight value is different than the second weight value.

4. The method of claim 2, wherein the second weight value is larger than the first weight value.

5. The method of claim 4, wherein the second manual operation of the vehicle occurs closer in time, than the first manual operation, to receiving the request to implement the semi-automated driving operation.

6. The method of claim 1, wherein the first vehicle drive parameter monitored during the first and second manual operations of the vehicle corresponds to a first direction of travel of the vehicle.

7. The method of claim 6, comprising:
concurrently monitoring with the first vehicle drive parameter, by the controller, a second vehicle drive parameter corresponding to a second direction different from the first direction of travel during the first manual operation and the second manual operation of the vehicle by the operator.

8. The method of claim 7, comprising:
calculating, by the controller, a second weighted average based on the second vehicle drive parameter monitored during the first manual operation of the vehicle and the second vehicle drive parameter monitored during the second manual operation of the vehicle.

9. The method of claim 8, wherein the first vehicle drive parameter comprises acceleration in the first direction and the second vehicle drive parameter comprises acceleration in the second direction.

10. The method of claim 9, wherein the first and second directions are substantially orthogonal to each other.

11. The method of claim 9, further comprising:
modifying the calculated first weighted average based on the calculated second weighted average when the calculated second weighted average falls outside of a predefined mid-range.

12. The method of claim 11, further comprising:
based on the modified first weighted average, controlling, by the controller, implementation of the semi-automated driving operation.

13. The method of claim 1, wherein controlling implementation of the semi-automated driving operation comprises limiting a maximum acceleration of the vehicle.

14. The method of claim 1, wherein a semi-automated driving operation of the vehicle occurs between the first and second manual operations.

15. The method of claim 1, wherein calculating the first weighted average comprises:
calculating a first component of the first weighted average by applying a first weight value to a first averaged value related to the first vehicle parameter monitored during the first manual operation of the vehicle;
calculating a second component of the first weighted average by applying a second weight value to a second averaged value related to the first vehicle parameter monitored during the second manual operation of the vehicle; and
calculating the first weighted average based on the calculated first and second components.

16. A system for operating a materials handling vehicle comprising:

a memory storing executable instructions; and
a processor in communication with the memory, wherein execution of the executable instructions by the processor causes the processor to:
monitor a first vehicle drive parameter during a first manual operation of the vehicle by an operator;
monitor the first vehicle drive parameter during a second manual operation of the vehicle by the operator;
receive, after the first manual operation of the vehicle and the second manual operation of the vehicle, a request to implement a semi-automated driving operation;
calculate a first weighted average based on the first vehicle drive parameter monitored during the first manual operation of the vehicle and the first vehicle drive parameter monitored during the second manual operation of the vehicle; and
control implementation of the semi-automated driving operation based at least in part on the calculated first weighted average.

17. The system of claim 16, wherein calculating the first weighted average comprises:
calculating a first component of the first weighted average by applying a first weight value to a first processed value related to the first vehicle drive parameter monitored during the first manual operation of the vehicle;
calculating a second component of the first weighted average by applying a second weight value to a second processed value related to the first vehicle drive parameter monitored during the second manual operation of the vehicle; and
calculating the first weighted average based on the calculated first and second components.

18. The system of claim 17, wherein the first weight value is different than the second weight value.

19. The system of claim 17, wherein the second weight value is larger than the first weight value.

20. The system of claim 19, wherein the second manual operation of the vehicle occurs closer in time, than the first manual operation, to receiving the request to implement the semi-automated driving operation.

21. The system of claim 16, wherein the first vehicle drive parameter monitored during the first and second manual operations of the vehicle corresponds to a first direction of travel of the vehicle.

22. The system of claim 21, wherein execution of the executable instructions by the processor causes the processor to:
concurrently monitor with the first vehicle drive parameter a second vehicle drive parameter corresponding to a second direction different from the first direction of travel during the first manual operation and the second manual operation of the vehicle by the operator.

23. The system of claim 22, wherein execution of the executable instructions by the processor causes the processor to:
calculate a second weighted average based on the second vehicle drive parameter monitored during the first manual operation of the vehicle and the second vehicle drive parameter monitored during the monitored second manual operation of the vehicle.

24. The system of claim 23, wherein the first vehicle drive parameter comprises acceleration in the first direction and the second vehicle drive parameter comprises acceleration in the second direction.

25. The system of claim 24, wherein the first and second directions are substantially orthogonal to each other.

26. The system of claim 24, further wherein execution of the executable instructions by the processor causes the processor to:
   modify the calculated first weighted average based on the calculated second weighted average when the calculated second weighted average falls outside of a predefined mid-range.

27. The system of claim 26, wherein execution of the executable instructions by the processor causes the processor to:
   control implementation of the semi-automated driving operation based on the modified first weighted average.

28. The system of claim 16, wherein controlling implementation of the semi-automated driving operation comprises limiting a maximum acceleration of the vehicle.

* * * * *

UNITED STATES PATENT AND TRADEMARK OFFICE
CERTIFICATE OF CORRECTION

PATENT NO. : 11,827,503 B2
APPLICATION NO. : 17/249798
DATED : November 28, 2023
INVENTOR(S) : Sebastian Theos, Johannes Nachtigal and Andreas Simon It is certified that error appears in the above-identified patent and that said Letters Patent is hereby corrected as shown below:

In the Specification

Column 15, Lines 5-11, Equation 1, that portion of the equation reading:

$$wa_{x\text{-}(i+1)} = \frac{wa_{y\text{-}i} * g_1 + a_{y\_[(i*m)+1]} * g_2 + a_{y\_[(i*m)+2]} * g_3 + a_{y\_[(i*m)+3]} * g_4}{(\Sigma g_s)}$$

Should read:

$$wa_{x\text{-}(i+1)} = \frac{wa_{x\text{-}i} * g_1 + a_{x\_[(i*m)+1]} * g_2 + a_{x\_[(i*m)+2]} * g_3 + a_{x\_[(i*m)+3]} * g_4}{\Sigma g_s}$$

Signed and Sealed this
Fourth Day of June, 2024

Katherine Kelly Vidal
*Director of the United States Patent and Trademark Office*